US012218915B2

(12) United States Patent
Golikov et al.

(10) Patent No.: US 12,218,915 B2
(45) Date of Patent: Feb. 4, 2025

(54) WAN OPTIMIZATION FOR ENCRYPTED DATA TRAFFIC USING FULLY HOMOMORPHIC ENCRYPTION

(71) Applicant: VMware LLC, Palo Alto, CA (US)

(72) Inventors: Igor Golikov, Kfar Saba (IL); Aran Bergman, Givatayim (IL); Lior Gal, Yoqneam Illit (IL); Avishay Yanai, Petach-Tikva (IL); Israel Cidon, San Francisco, CA (US); Alex Markuze, Rosh HaAyin (IL); Eyal Zohar, Shimshit (IL)

(73) Assignee: VMware LLC, Palo Alto, CA (US)

( * ) Notice: Subject to any disclaimer, the term of this patent is extended or adjusted under 35 U.S.C. 154(b) by 237 days.

(21) Appl. No.: 18/076,328

(22) Filed: Dec. 6, 2022

(65) Prior Publication Data
US 2024/0187381 A1 Jun. 6, 2024

(51) Int. Cl.
*H04L 9/40* (2022.01)
*H04L 9/14* (2006.01)

(52) U.S. Cl.
CPC ...... *H04L 63/0272* (2013.01); *H04L 63/0428* (2013.01); *H04L 9/14* (2013.01)

(58) Field of Classification Search
CPC .... H04L 63/0272; H04L 63/0428; H04L 9/14
See application file for complete search history.

(56) References Cited

U.S. PATENT DOCUMENTS

| | | | | |
|---|---|---|---|---|
| 8,401,181 | B2* | 3/2013 | Lumb | G06F 21/602 707/681 |
| 8,600,050 | B1* | 12/2013 | Ye | H04L 63/0428 713/160 |
| 9,298,942 | B1* | 3/2016 | Millikin | H04L 63/0435 |
| 9,313,181 | B2* | 4/2016 | Rohloff | H04L 9/3093 |
| 11,075,888 | B2* | 7/2021 | Jain | H04L 9/088 |
| 11,502,871 | B2* | 11/2022 | Sundararajan | H04L 45/64 |
| 11,582,195 | B1* | 2/2023 | Karppanen | H04L 63/0457 |
| 11,750,620 | B2* | 9/2023 | Gremaud | H04L 63/0471 713/168 |
| 11,824,973 | B2* | 11/2023 | Bryden | H04L 63/029 |
| 11,909,885 | B2* | 2/2024 | Soryal | H04L 9/3297 |
| 2017/0104723 | A1* | 4/2017 | Merritt | H04L 63/0281 |

(Continued)

OTHER PUBLICATIONS

Non-Published Commonly Owned U.S. Appl. No. 18/076,309, filed Dec. 6, 2022, 82 pages, VMware, Inc.

(Continued)

*Primary Examiner* — Viral S Lakhia
(74) *Attorney, Agent, or Firm* — Quarles & Brady LLP

(57) ABSTRACT

Some embodiments of the invention provide a method for WAN (wide area network) optimization for a WAN that connects multiple sites, each of which has at least one router. At a gateway router deployed to a public cloud, the method receives from at least two routers at least two sites, multiple data streams destined for a particular centralized datacenter. The method performs a WAN optimization operation to aggregate the multiple streams into one outbound stream that is WAN optimized for forwarding to the particular centralized datacenter. The method then forwards the WAN-optimized data stream to the particular centralized datacenter.

18 Claims, 26 Drawing Sheets

(56) References Cited

U.S. PATENT DOCUMENTS

2023/0041916 A1* 2/2023 Zhang .................. H04L 45/566
2024/0235832 A1* 7/2024 Sajjad ................ H04L 63/0471

OTHER PUBLICATIONS

Non-Published Commonly Owned U.S. Appl. No. 18/076,310, filed Dec. 6, 2022, 84 pages, VMware, Inc.

Non-Published Commonly Owned U.S. Appl. No. 18/076,312, filed Dec. 6, 2022, 83 pages, VMware, Inc.

Non-Published Commonly Owned U.S. Appl. No. 18/076,313, filed Dec. 6, 2022, 83 pages, VMware, Inc.

Non-Published Commonly Owned U.S. Appl. No. 18/076,314, filed Dec. 6, 2022, 82 pages, VMware, Inc.

Non-Published Commonly Owned Related U.S. Appl. No. 18/076,317 with similar specification, filed Dec. 6, 2022, 82 pages, VMware, Inc.

Non-Published Commonly Owned Related U.S. Appl. No. 18/076,318 with similar specification, filed Dec. 6, 2022, 82 pages, VMware, Inc.

Non-Published Commonly Owned Related U.S. Appl. No. 18/076,322 with similar specification, filed Dec. 6, 2022, 83 pages, VMware, Inc.

Non-Published Commonly Owned Related U.S. Appl. No. 18/076,325 with similar specification, filed Dec. 6, 2022, 83 pages, VMware, Inc.

Non-Published Commonly Owned Related U.S. Appl. No. 18/076,330 with similar specification, filed Dec. 6, 2022, 82 pages, VMware, Inc.

Non-Published Commonly Owned Related U.S. Appl. No. 18/076,332 with similar specification, filed Dec. 6, 2022, 83 pages, VMware, Inc.

* cited by examiner

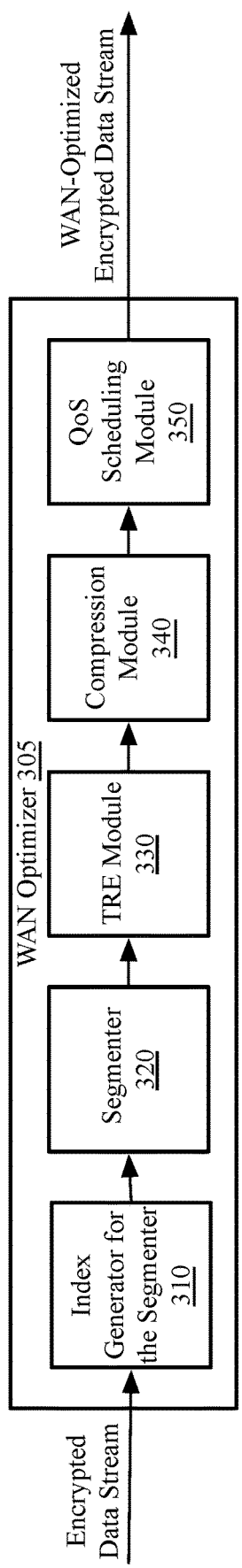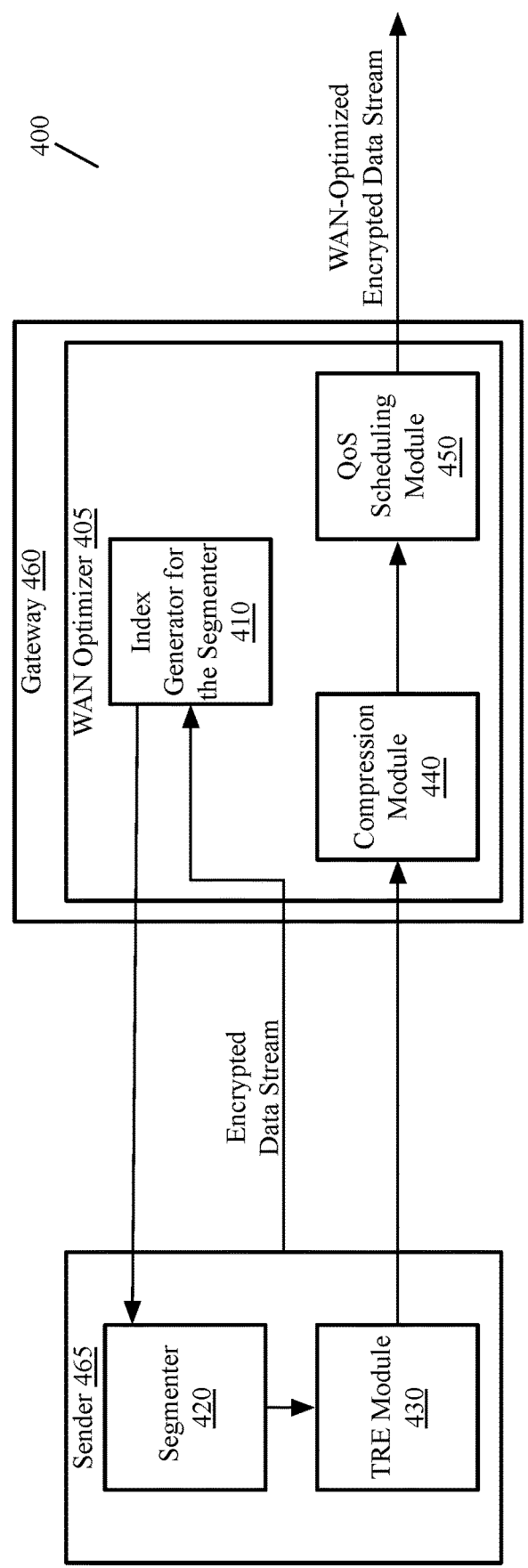
*Figure 3*
*Figure 4*

WAN OPTIMIZATION FOR ENCRYPTED DATA TRAFFIC USING FULLY HOMOMORPHIC ENCRYPTION

BACKGROUND

Today, modern enterprise infrastructures, applications, and services are increasingly becoming geo-distributed, spanning large geographical distances across edge nodes, clouds, and datacenters. These applications rely on data traditionally placed in central data centers connected by LAN (local area network). However, applications that connect with remote data and other services over WAN experience considerable cost and performance penalties. The common solution of today is to move the data to a central data-warehouse or few data-lakes and allocate the compute at the same place where other services and the data reside. This inflexible, slow, and expensive solution creates indiscriminate data duplication and synchronization over multiple cloud regions.

BRIEF SUMMARY

Some embodiments of the invention provide a method for WAN (wide area network) optimization for a WAN that connects multiple sites, each of which has at least one router (e.g., edge router). At a gateway router deployed to a public cloud, the method receives from at least two routers at least two sites, multiple data streams destined for a particular centralized datacenter. The method performs a WAN optimization operation to aggregate the multiple streams into one outbound stream that is WAN-optimized for forwarding to the particular centralized datacenter, and subsequently forwards the WAN-optimized data stream to the particular centralized datacenter.

In some embodiments, the WAN optimization operation is an aggregation first operation in a set of WAN optimization operations performed by the gateway router that also include a traffic redundancy elimination (TRE) second operation and a compression third operation. The compression third operation is performed, in some embodiments, on a version of the data stream produced by the TRE second operation, and results in the production of the WAN-optimized data stream. Each data stream, in some embodiments, includes a respective set of segments, and the TRE second operation includes identifying redundant segments in the aggregated data streams, and replacing the identified redundant segments with segment identifiers that map to the redundant segments. As a result, a single, optimized data stream is able to be sent to the centralized datacenter as opposed to multiple, unoptimized data streams sent individually from the multiple routers. In some embodiments, each data stream is federated learning data that includes updates parameters for training and updating a machine learning module at the particular centralized datacenter.

Some embodiments of the invention provide a method for WAN optimization in a WAN that connects at least two sites. At a source-side gateway router deployed to a public cloud, the method receives an encrypted data stream sent by a source and destined to a receiver. Without decrypting the encrypted data stream, the method performs a set of WAN optimization operations on the encrypted data stream to produce a WAN-optimized encrypted data stream. The set of WAN optimization operations, in some embodiments, include at least a TRE first operation for identifying redundant segments in the encrypted data stream and replacing the redundant segments with segment identifiers corresponding to the redundant segments, and a compression second operation for compressing the encrypted data stream and producing the WAN-optimized encrypted data stream. The method then forwards the WAN-optimized encrypted data stream to the receiver.

In some embodiments, a receiver-side gateway router is deployed to a public cloud for processing optimized encrypted data streams sent to the receiver. In some such embodiments, the receiver-side gateway router receives the WAN-optimized encrypted data stream and, without decrypting the WAN-optimized encrypted data stream, performs a decompression first operation to decompress the WAN-optimized encrypted data stream and produce an encrypted data stream, and a reinsertion second operation to reinsert a set of redundant segments to the data stream to reconstruct the encrypted data stream. After reconstructing the encrypted data stream, the receiver-side gateway router forwards the reconstructed encrypted data stream to the destination.

In order to prevent as much unnecessary traffic as possible, some embodiments utilize probabilistic data filters for removing redundancies from the encrypted data streams. For example, in some embodiments, the receiver, or receiver-side gateway router, generates a probabilistic data filter representing a set of segment identifiers stored in a segment cache of the receiver. The receiver then compresses and sends the probabilistic data filter to all senders (including the sender-side gateway router(s)) for use in identifying and removing redundancies from data streams destined to the receiver.

Accordingly, after identifying a set of segments from an input stream of a data stream, the sender or sender-side gateway router uses, for each segment in the identified set of segments, the probabilistic data filter to determine whether the segment is already stored in the segment cache at the receiver. Upon determining that the segment is already stored in the segment cache at the destination, the sender or sender-side gateway router replaces the segment with a segment identifier corresponding to the segment for forwarding to the destination. In some embodiments, the receiver periodically updates the probabilistic data filter as it adds new segments and deletes old segments from its segment cache, and provides the updates to the senders to avoid receiving redundant segments.

In some embodiments, an FHE (fully homomorphic encryption) scheme is utilized by the senders, receivers, and gateway routers with WAN optimizers in order to increase privacy for the encrypted data being sent. In a first FHE scheme, at a source machine (i.e., sender) of a data stream, the method generates a tuple of keys for use in encrypting, evaluating, and decrypting the data stream, and provides a first key (i.e., a public evaluation key) from the tuple of keys to the sender-side gateway router identified as a next hop toward a destination (i.e., receiver) of the data stream. After encrypting the data stream using a second key from the set (e.g., a public encryption key), the method forwards the encrypted data stream to the next hop gateway router (i.e., sender-side gateway router). The method then receives a set of encrypted indices from the next hop gateway router for use in deriving a set of encrypted segments from the encrypted data stream, and uses the received set of encrypted indices to derive the set of encrypted segments. The method then sends the set of encrypted segments to the next hop gateway for optimization and forwarding to the destination of the data stream.

At the gateway router of some such embodiments, the gateway router receives the public evaluation key and the encrypted data stream from the sender. Without decrypting the encrypted data stream, the gateway router uses the received public evaluation key to compute a set of encrypted indices for the encrypted data stream and provides the set of indices to the sender to enable the sender to derive a set of encrypted segments and compute a corresponding set of digests from the encrypted data stream. Upon receiving the set of encrypted segments and the set of digests from the sender, the gateway router performs a set of optimization operations on the set of encrypted segments to construct an optimized encrypted data stream of the set of encrypted segments for forwarding to the receiver.

When the receiver receives the optimized encrypted data stream, the receiver identifies each segment in the set of segments. For each segment, the receiver uses a symmetrical encryption key shared with the sender to decrypt the segment, and updates a state for the segment stored in its segment cache. The state, according to some embodiments, is a mapping between the segment and its digest. The receiver then uses the decrypted segments to reconstruct the data stream in full.

In some embodiments, a second FHE scheme is instead utilized in order to reduce leakage and increase privacy further. The sender in the second FHE scheme generates the set of keys and provides the public evaluation key and the encrypted data stream to the sender-side gateway router. Upon receiving the set of encrypted indices from the sender-side gateway router, the sender uses the received set of encrypted indices to derive a set of encrypted segments from the encrypted data stream. For a subset of encrypted segments in the set of encrypted segments, the sender determines that the subset of encrypted segments is redundant encrypted segments, and replaces each redundant encrypted segment in the subset of redundant encrypted segments with an encrypted value (e.g., an encrypted value generated using a probabilistic encryption operation) that maps to the redundant encrypted segment. The sender then sends the set of encrypted segments and the encrypted values used to replace the subset of redundant encrypted segments to the sender-side gateway for optimization and forwarding to the receiver. The operations performed by the sender-side gateway router during the second FHE scheme are similar to those performed by the sender-side gateway router during the first FHE scheme.

At the receiver, upon receiving the optimized, encrypted data stream, the receiver uses a particular encryption key shared with a source of the data stream and the set of indices corresponding to the data stream to decompose the optimized, encrypted data stream and identify a set of full encrypted segments and the set of encrypted values. For each encrypted value in the set of encrypted values, the receiver retrieves the respective segment from the segment cache for reinsertion into the encrypted data stream, and uses the identified set of full segments and set of retrieved segments to reconstruct the data stream in full.

A third FHE scheme of some embodiments aims to reduce the interactions between the sender and the sender-side gateway, according to some embodiments. In some such embodiments, the sender encrypts the data stream, and sends the encrypted data stream to the sender-side gateway for all optimization operations. The gateway router receives the public evaluation key from the receiver, in some such embodiments, and receives the encrypted data stream from the sender. Without decrypting the encrypted data stream, the gateway router uses the received public evaluation key to compute a set of encrypted indices for the encrypted data stream, and to derive an optimized set of encrypted segments and digests from the encrypted data stream. The gateway router then forwards the optimized data stream to the receiver.

In the third FHE scheme, the receiver generates the tuple of keys and provides the public encryption key for encrypting the data stream to the sender, and provides the public evaluation key to the sender-side gateway router. Upon receiving the optimized encrypted data stream, and without decrypting the optimized, encrypted data stream, the receiver uses a third key (e.g., a secret decryption key) from the tuple of keys to decompress the optimized, encrypted data stream and to identify the set of encrypted segments. The receiver then uses the identified set of encrypted segments to reconstruct the encrypted data stream in full.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 3 conceptually illustrates a diagram of a WAN optimizer of some embodiments that is implemented in a cloud gateway.

FIG. 4 conceptually illustrates another a diagram of a WAN optimizer of some embodiments that is implemented in a cloud gateway.

DETAILED DESCRIPTION

Figure 1:
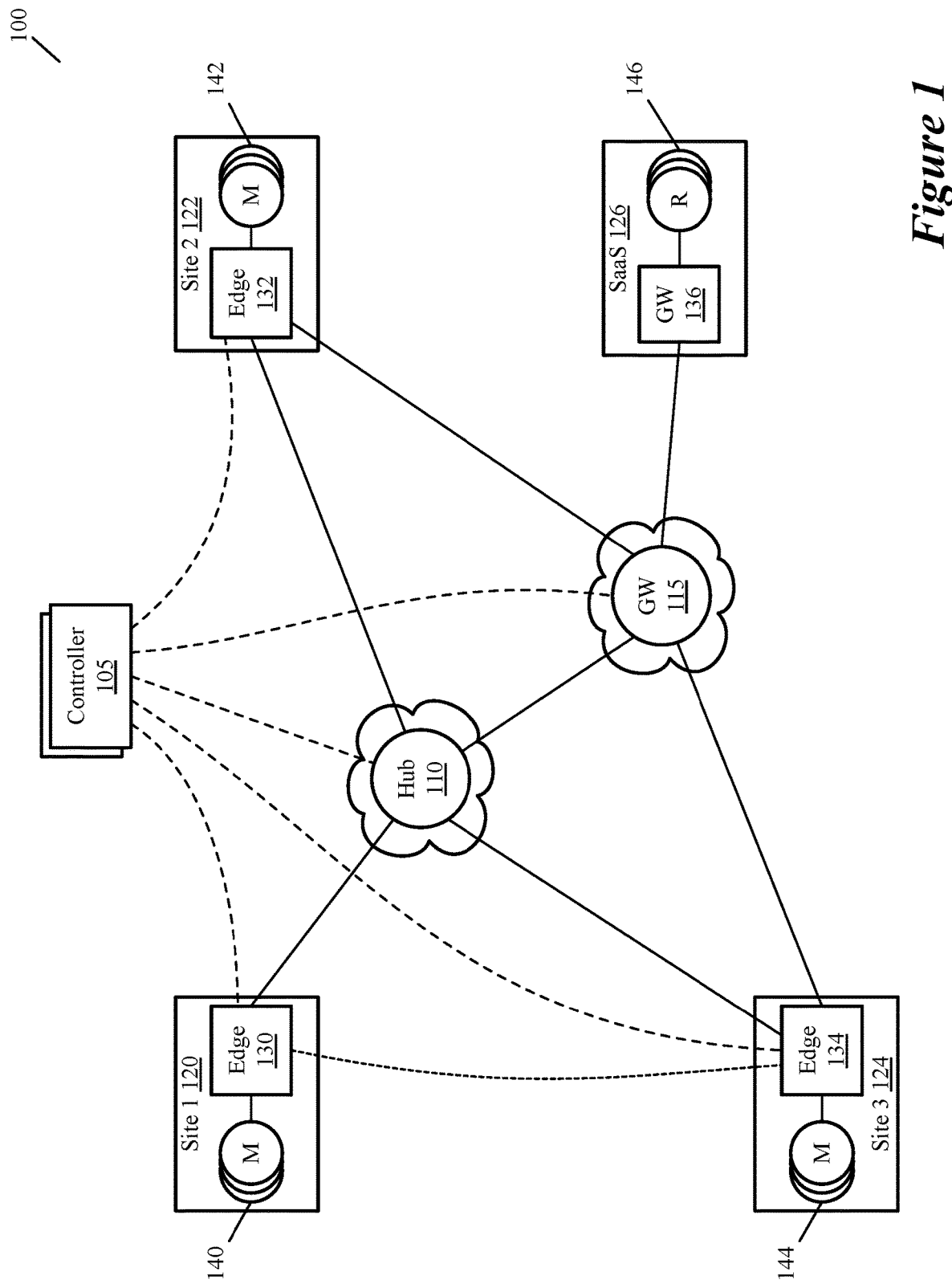
FIG. 1 illustrates an SD-WAN of some embodiments that connects various branch sites (also referred to herein as branch networks) to each other and to at least one third-party datacenter.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for WAN (wide area network) optimization for a WAN that connects multiple sites, each of which has at least one router (e.g., edge router). At a gateway router deployed to a public cloud, the method receives from at least two routers at least two sites, multiple data streams destined for a particular centralized datacenter. The method performs a WAN optimization operation to aggregate the multiple streams into one outbound stream that is WAN-optimized for forwarding to the particular centralized datacenter, and subsequently forwards the WAN-optimized data stream to the particular centralized datacenter.

In some embodiments, the WAN optimization operation is an aggregation first operation in a set of WAN optimization operations performed by the gateway router that also include a traffic redundancy elimination (TRE) second operation and a compression third operation. The compression third operation is performed, in some embodiments, on a version of the data stream produced by the TRE second operation, and results in the production of the WAN-optimized data stream. Each data stream, in some embodiments, includes a respective set of segments, and the TRE second operation includes identifying redundant segments in the aggregated data streams, and replacing the identified redundant segments with segment identifiers that map to the redundant segments. As a result, a single, optimized data stream is able to be sent to the centralized datacenter as opposed to multiple, unoptimized data streams sent individually from the multiple routers. In some embodiments, each data stream is federated learning data that includes updates parameters for training and updating a machine learning module at the particular centralized datacenter.

Some embodiments of the invention provide a method for WAN optimization in a WAN that connects at least two sites. At a source-side gateway router deployed to a public cloud, the method receives an encrypted data stream sent by a source and destined to a receiver. Without decrypting the encrypted data stream, the method performs a set of WAN optimization operations on the encrypted data stream to produce a WAN-optimized encrypted data stream. The set of WAN optimization operations, in some embodiments, include at least a TRE first operation for identifying redundant segments in the encrypted data stream and replacing the redundant segments with segment identifiers corresponding to the redundant segments, and a compression second operation for compressing the encrypted data stream and producing the WAN-optimized encrypted data stream. The method then forwards the WAN-optimized encrypted data stream to the receiver.

In some embodiments, a receiver-side gateway router is deployed to a public cloud for processing optimized encrypted data streams sent to the receiver. In some such embodiments, the receiver-side gateway router receives the WAN-optimized encrypted data stream and, without decrypting the WAN-optimized encrypted data stream, performs a decompression first operation to decompress the WAN-optimized encrypted data stream and produce an encrypted data stream, and a reinsertion second operation to reinsert a set of redundant segments to the data stream to reconstruct the encrypted data stream. After reconstructing the encrypted data stream, the receiver-side gateway router forwards the reconstructed encrypted data stream to the destination.

In order to prevent as much unnecessary traffic as possible, some embodiments utilize probabilistic data filters for removing redundancies from the encrypted data streams. For example, in some embodiments, the receiver, or receiver-side gateway router, generates a probabilistic data filter representing a set of segment identifiers stored in a segment cache of the receiver. The receiver then compresses and sends the probabilistic data filter to all senders (including the sender-side gateway router(s)) for use in identifying and removing redundancies from data streams destined to the receiver.

Accordingly, after identifying a set of segments from an input stream of a data stream, the sender or sender-side gateway router uses, for each segment in the identified set of segments, the probabilistic data filter to determine whether the segment is already stored in the segment cache at the receiver. Upon determining that the segment is already stored in the segment cache at the destination, the sender or sender-side gateway router replaces the segment with a segment identifier corresponding to the segment for forwarding to the destination. In some embodiments, the receiver periodically updates the probabilistic data filter as it adds new segments and deletes old segments from its segment cache, and provides the updates to the senders to avoid receiving redundant segments.

In some embodiments, an FHE (fully homomorphic encryption) scheme is utilized by the senders, receivers, and gateway routers with WAN optimizers in order to increase privacy for the encrypted data being sent. In a first FHE scheme, at a source machine (i.e., sender) of a data stream, the method generates a tuple of keys for use in encrypting, evaluating, and decrypting the data stream, and provides a first key (i.e., a public evaluation key) from the tuple of keys to the sender-side gateway router identified as a next hop toward a destination (i.e., receiver) of the data stream. After encrypting the data stream using a second key (e.g., a public encryption key) from the set, the method forwards the encrypted data stream to the next hop gateway router (i.e., sender-side gateway router). The method then receives a set of encrypted indices from the next hop gateway router for use in deriving a set of encrypted segments from the encrypted data stream, and uses the received set of encrypted indices to derive the set of encrypted segments. The method then sends the set of encrypted segments to the next hop gateway for optimization and forwarding to the destination of the data stream.

At the gateway router of some such embodiments, the gateway router receives the public evaluation key and the encrypted data stream from the sender. Without decrypting the encrypted data stream, the gateway router uses the received public evaluation key to compute a set of encrypted indices for the encrypted data stream and provides the set of indices to the sender to enable the sender to derive a set of encrypted segments and compute a corresponding set of digests from the encrypted data stream. Upon receiving the set of encrypted segments and the set of digests from the sender, the gateway router performs a set of optimization operations on the set of encrypted segments to construct an optimized encrypted data stream of the set of encrypted segments for forwarding to the receiver.

When the receiver receives the optimized encrypted data stream, the receiver identifies each segment in the set of segments. For each segment, the receiver uses a symmetrical encryption key shared with the sender to decrypt the segment, and updates a state for the segment stored in its segment cache. The state, according to some embodiments, is a mapping between the segment and its digest. The receiver then uses the decrypted segments to reconstruct the data stream in full.

In some embodiments, a second FHE scheme is instead utilized in order to reduce leakage and increase privacy further. The sender in the second FHE scheme generates the set of keys and provides the public evaluation key and the encrypted data stream to the sender-side gateway router. Upon receiving the set of encrypted indices from the sender-side gateway router, the sender uses the received set of encrypted indices to derive a set of encrypted segments from the encrypted data stream. For a subset of encrypted segments in the set of encrypted segments, the sender determines that the subset of encrypted segments is redundant encrypted segments, and replaces each redundant encrypted segment in the subset of redundant encrypted segments with an encrypted value (e.g., an encrypted value generated using a probabilistic encryption operation) that maps to the redundant encrypted segment. The sender then sends the set of encrypted segments and the encrypted values used to replace the subset of redundant encrypted segments to the sender-side gateway for optimization and forwarding to the receiver. The operations performed by the sender-side gateway router during the second FHE scheme are similar to those performed by the sender-side gateway router during the first FHE scheme.

At the receiver, upon receiving the optimized, encrypted data stream, the receiver uses a particular encryption key shared with a source of the data stream and the set of indices corresponding to the data stream to decompose the optimized, encrypted data stream and identify a set of full encrypted segments and the set of encrypted values. For each encrypted value in the set of encrypted values, the receiver retrieves the respective segment from the segment cache for reinsertion into the encrypted data stream, and uses the identified set of full segments and set of retrieved segments to reconstruct the data stream in full.

A third FHE scheme of some embodiments aims to reduce the interactions between the sender and the sender-side gateway, according to some embodiments. In some such embodiments, the sender encrypts the data stream, and sends the encrypted data stream to the sender-side gateway for all optimization operations. The gateway router receives the public evaluation key from the receiver, in some such embodiments, and receives the encrypted data stream from the sender. Without decrypting the encrypted data stream, the gateway router uses the received public evaluation key to compute a set of encrypted indices for the encrypted data stream, and to derive an optimized set of encrypted segments and digests from the encrypted data stream. The gateway router then forwards the optimized data stream to the receiver.

In the third FHE scheme, the receiver generates the tuple of keys and provides the public encryption key for encrypting the data stream to the sender, and provides the public evaluation key to the sender-side gateway router. Upon receiving the optimized encrypted data stream, and without decrypting the optimized, encrypted data stream, the receiver uses a third key (e.g., a secret decryption key) from the tuple of keys to decompress the optimized, encrypted data stream and to identify the set of encrypted segments. The receiver then uses the identified set of encrypted segments to reconstruct the encrypted data stream in full. One of ordinary skill in the art will realize that many embodiments are equally applicable to optimizing traffic flows through a LAN (local area network) or MAN (metropolitan area network), even though the above-described embodiments and several embodiments described below are described by reference to examples for optimizing traffic flow through a WAN.

FIG. 1 illustrates an SD-WAN of some embodiments that connects various branch sites (also referred to herein as branch networks) to each other and to at least one third-party datacenter. The SD-WAN 100 enables high performance and reliable branch network access across multiple different clouds, according to some embodiments. As shown, each of the branch networks 120, 122, and 124 are connected to the SD-WAN 100 by the SD-WAN edge forwarding elements (FEs) 130, 132, and 134, and the third-party SaaS (software as a service) datacenter 126 is connected to the SD-WAN 100 by the SD-WAN gateway forwarding element 136. Additionally, the SD-WAN 100 includes an SD-WAN controller cluster 105, a hub FE 110, and a cloud gateway 115. As shown, the hub FE 110 and the cloud gateway 115 are deployed to public clouds 150 and 155 respectively. In some embodiments, the elements of the SD-WAN 100 are in a full mesh topology in which each forwarding element is connected to every other forwarding element, while in this embodiment, the SD-WAN forwarding elements are in a partial mesh topology.

The SD-WAN controller cluster 105, in some embodiments, is a cluster of network managers and controllers that serves as a central point for managing (e.g., defining and modifying) configuration data that is provided to the edge FEs and/or gateways to configure some or all of the operations. In some embodiments, this SD-WAN controller cluster 105 is in one or more public cloud datacenters, while in other embodiments it is in one or more private datacenters. In some embodiments, the SD-WAN controller cluster 105 has a set of manager servers that defines and modifies configuration data for the SD-WAN 100, and a set of controller servers that distributes the configuration data to the edge FEs, hub FEs, and cloud gateways. In some embodiments, the SD-WAN controller 105 directs edge FEs and hub FEs to use certain gateways (i.e., assigns a gateway to the edge forwarding elements and hubs).

In some embodiments, each of the branch networks 120-124 belongs to the same entity, according to some embodiments. The branch networks 120-124, in some embodiments, are multi-machine sites of the entity. Examples of multi-machine sites of some embodiments include multi-user compute sites (e.g., branch offices or other physical locations having multiuser computers and other user-operated devices and serving as source computers and devices for requests to other machines at other sites), datacenters (e.g., locations housing servers), etc. These multi-machine sites are often at different physical locations (e.g., different buildings, different cities, different states, etc.). Each of the branch sites 120-124 has a respective set of machines 140, 142, and 144 that communicate with other machines and entities outside of their respective sites via the edge FEs 130-134. For instance, the edge FEs 130-134 each connect to one or both of the hub FE 110 and cloud gateway 115, and the cloud gateway 115 provides further connection to the SaaS datacenter 126 that hosts resources 146.

The SaaS datacenter 126 is a cloud datacenter, according to some embodiments. In some embodiments, cloud datacenters are public cloud datacenters, while in other embodiments cloud datacenters are private cloud datacenters. In still other embodiments, cloud datacenters may be a combination of public and private cloud datacenters. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

The SaaS datacenter 126 connects to the SD-WAN through its respective gateway FE 136, which connects to the cloud gateway 115. In some embodiments, additional SD-WAN gateways may be present and can include multi-tenant, stateless service gateways deployed in strategic points of presence (PoPs) across the globe. Some such gateways serve as gateways to various clouds and datacenters. Also, in some embodiments, other SD-WAN forwarding elements may be present, including additional edge devices located at other branch sites of the entity, as well as additional SD-WAN hub FEs. The SD-WAN hub FEs 110, in some embodiments, can be used to connect to other edge FEs of other branch sites to each other, as well as to resources at a datacenter that hosts the hub FE. Hub FEs, in some embodiments, use or have one or more service engines to perform services (e.g., middlebox services) on data messages that it forwards from one branch site to another branch site.

Figure 2:
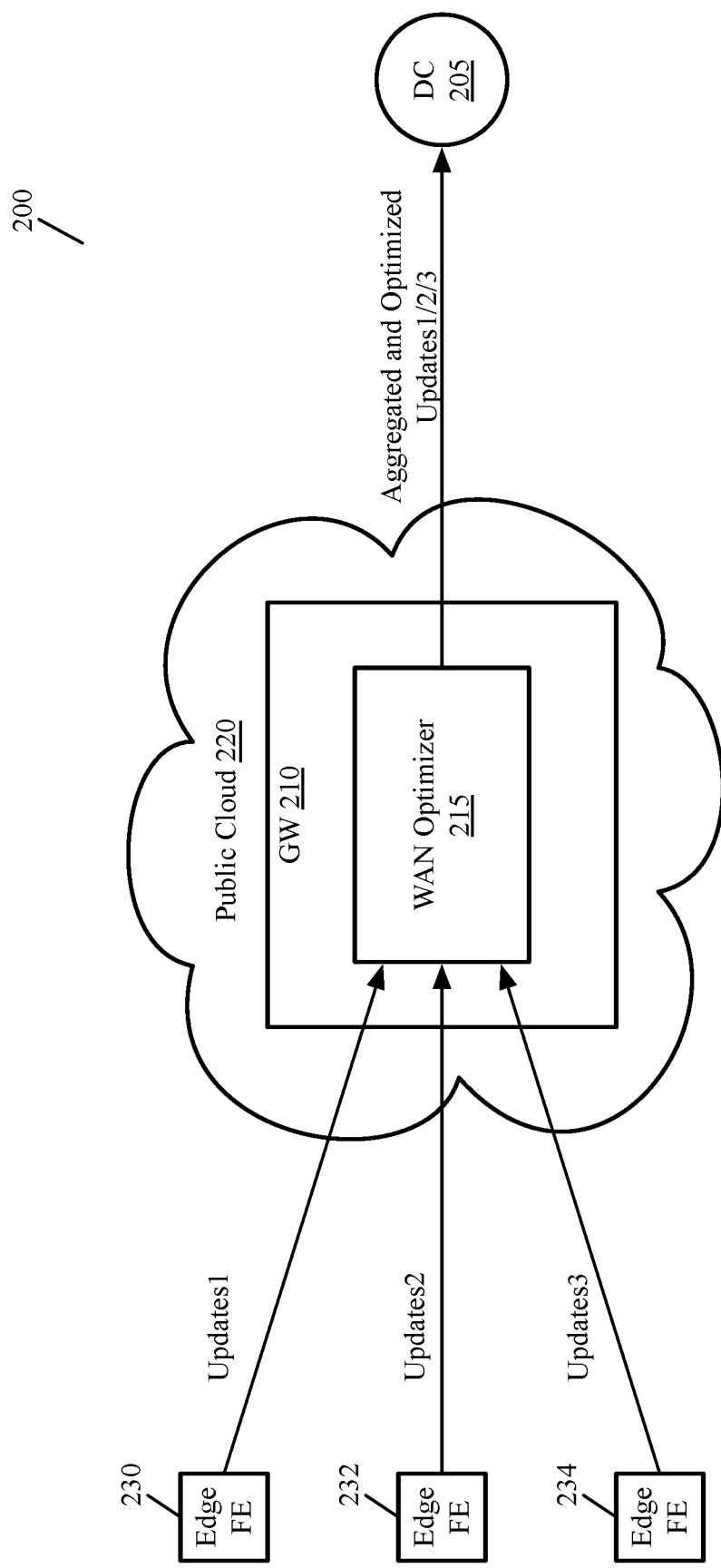
FIG. 2 conceptually illustrates an example of a cloud gateway of some embodiments that is equipped with a WAN optimizer for aggregating and optimizing data streams received from multiple different edge FEs to produce a single optimized data stream for forwarding to a centralized datacenter.

In some embodiments, SD-WAN cloud gateways are configured as aggregation points for various geographical regions and, as such, receive data streams from edge FEs operating at different branch sites in the various geographical regions. In some embodiments, the cloud gateways are equipped with WAN optimizers for aggregating and optimizing data streams received from edge FEs at branch sites and forwarding the aggregated and optimized data streams to a centralized datacenter. FIG. 2 conceptually illustrates an example of a cloud gateway of some embodiments that is equipped with a WAN optimizer for aggregating and optimizing data streams received from multiple different edge FEs to produce a single optimized data stream for forwarding to a centralized datacenter.

The SD-WAN 200 includes a centralized datacenter 205, a cloud gateway 210 deployed to a public cloud 220, and multiple edge FEs 230, 232, and 234 each deployed to a different branch site (not shown). While cloud gateways are described above as forwarding elements that connect elements of the SD-WAN to external networks and third-party datacenters, the cloud gateway 210 in this example has functionalities similar to the functionalities of a hub FE for the edge FEs 230-234 and the centralized datacenter 205 as it forwards data between the edge FEs 230-234 and the centralized datacenter 205.

The cloud gateway 210 includes a WAN optimizer 215, as shown. In some embodiments, the WAN optimizer 215 is configured to aggregate multiple data streams received from the edge FEs 230-234 to produce a single, aggregated data stream, and then performs one or more other WAN optimization operations on the single, aggregated data stream in order to produce a single WAN-optimized data stream for forwarding to the centralized datacenter 205. In some embodiments, the data streams sent to the cloud gateway 210 for aggregation, optimization, and forwarding are update streams for distributed and federated learning applications.

Distributed and federated learning applications, in some embodiments, rely on optimization algorithms such as stochastic gradient descent (SGD) and its variants (e.g., Federated Averaging, FedProx, SCAF-FOLD, etc.). In these algorithms, the training procedure is composed out of rounds, with each training round having the participating nodes (e.g., edge FEs located at branch sites) compute local parameters updates using data available to the participating nodes and exchange these updates for averaging and updating the model. In some embodiments, the training rounds continue until a termination criterion is met.

In order to accelerate these machine learning applications and prevent potential bottlenecks as the machine learning models rapidly increase in size and in the amounts of data used to train them, the WAN optimizer 215 is configured to intelligently eliminate redundancy in data transmission, according to some embodiments. For instance, in some embodiments, the WAN optimizer 215 handles aggregation and compression of neural-network gradients and parameter updates. As a result, bandwidth is significantly reduced and the training rounds are shortened.

Additionally, while the training procedure takes place in a single location, in some embodiments, it can benefit from data augmentation from other locations within the WAN. The WAN optimizer 215 can eliminate data redundancy, thereby significantly reducing the resources spent on data shuffling within the WAN, according to some embodiments. For example, when an anomaly detection machine learning model is built based on historical data application, it often holds structured data with most of the data being similar across the WAN (e.g., URL entries). As such, by implementing the WAN optimizer 215 in the cloud gateway 210, redundancies can be removed at the cloud gateway 210 before the data streams reach the centralized datacenter 205. For instance, each edge FE 230-234 is shown sending a respective updates stream to the WAN optimizer 215 at the gateway 210, while an aggregated and optimized updates stream is sent from the WAN optimizer 215 to the centralized datacenter 205.

The traffic (e.g., the aggregated and optimized updates stream) sent by the gateway router 210 traverses through an intervening network (not shown) to reach a destination-side gateway router (not shown) that forwards traffic to and from the datacenter 205. In some embodiments, the intervening network includes a private network, such as the MPLS network of a telephony company. In other embodiments, the intervening network includes one or more public networks, such as the Internet and/or one or more networks of one or more public clouds. In still other embodiments, the intervening network includes a combination of private and public networks (such as those mentioned above). Such traversal of intervening network fabric by traffic sent from a sender-side gateway (e.g., the cloud gateway 210) to a destination-side gateway (e.g., a destination-side gateway for the datacenter 205), is equally applicable to other WAN examples described below where a sender-side gateway router sends packets (e.g., in data streams) to a destination-side gateway router (e.g., a receiver).

In some embodiments, all WAN optimization operations are performed by the WAN optimizer that is implemented in the cloud gateway, while in other embodiments, a portion of the WAN optimization operations are performed by the senders of the data streams. FIG. 3 conceptually illustrates a diagram of a WAN optimizer of some embodiments that is implemented in a cloud gateway. As shown, the WAN optimizer 305 includes an index generator 310 for the segmenter, a segmenter 320, a TRE module 330, a compression module 340, and a QoS (quality of service) scheduling module 350.

When data streams are sent to the gateway (e.g., gateway 210), the streams are processed by the components of the WAN optimizer 305. In some embodiments, all data streams that traverse such a gateway are processed by the WAN optimizer 305, while in other embodiments, the gateway and WAN optimizer 305 are configured to only perform WAN optimization operations on certain data streams (e.g., between a certain source and destination). The WAN optimizer 305, in some embodiments, is provided with a particular key to enable to the WAN optimizer 305 to perform the WAN optimization operations on encrypted data streams without having to decrypt these data streams. As will be further described in the embodiments below, this particular key, in some embodiments, is a public evaluation key provided by either a source or destination of the data stream. In addition to the public evaluation key, the source and/or destination of the encrypted data stream, in some embodiments also provide an evaluation function, such as an FHE (fully homomorphic encryption) function for performing the WAN optimization operations on the encrypted data stream.

Homomorphic encryption is an encryption scheme where plaintext data is converted into ciphertext data that can be analyzed and worked with as though the ciphertext data were still in its original form (i.e., the plaintext data). When ciphertext data is generated using homomorphic encryption, computations can be performed on the ciphertext data without decrypting the ciphertext, and generate encrypted results. When the generated encrypted results are decrypted, the decrypted results are identical to results that would have been generated if the computations had been performed on the plaintext content rather than the ciphertext content. That is, homomorphic encryption is a form of encryption with an additional evaluation capability for running computations and programs over ciphertext content (i.e., encrypted data) without decrypting the ciphertext content (e.g., with the secret decryption key). The additional evaluation capability is enabled by homomorphic encryption algorithms, which are a type of encryption algorithm designed to allow the computations and programs to be run over the ciphertext data. Homomorphic encryption can be viewed as an extension of public-key cryptography.

As mentioned above and described further below, some embodiments utilize fully homomorphic encryption (FHE) schemes. FHE schemes further allow any computations and any programs to be run on encrypted inputs (i.e., a generated ciphertext), and produce encrypted results. These computations and programs can be run on the ciphertext by any party (e.g., any third party), including untrusted parties, without revealing the unencrypted inputs (i.e., the plaintext data), or the internal state. As such, these computations and programs can be outsourced without the risk of leaking the encrypted data, such as by sending the ciphertexts to a cloud for processing (e.g., to the public cloud 220 for processing by the WAN optimizer 215 of the gateway 210).

To run the computations and programs on the ciphertexts, FHE schemes use various keys in addition to the ciphertexts as input and produce encrypted outputs. Specifically, as also mentioned above, a public evaluation key generated for the FHE scheme is used as input along with a ciphertext to produce an encrypted output. For instance, upon receiving an encrypted data stream, the index generator 310 uses the public evaluation key and the evaluation function provided by the source and/or destination to compute a set of encrypted indices for the encrypted data stream. It should be noted that different embodiments can use different FHE schemes than those described herein. Additional information regarding homomorphic encryption, and FHE, can be found in the Homomorphic Encryption Standard (The Standard) maintained by the Homomorphic Encryption Standardization Consortium at homomorphicencryption.org.

The public evaluation key allows the index generator 310 to use the evaluation function to compute the set of indices for the encrypted data stream without decrypting the encrypted data stream. The public evaluation key is needed to perform homomorphic operations over the ciphertexts and is provided to any entity that will be performing computations over the ciphertexts. The public evaluation key is used as input along with the ciphertext as mentioned above, thus allowing for any computations or programs to be run over the ciphertext (i.e., the encrypted data stream) without accessing the secret key (i.e., secret decryption key mentioned above and further described below), and outputting encrypted results (i.e., the encrypted indices). As such, any entity that has the public evaluation key, and/or the public encryption key, cannot learn anything about the data from the only ciphertexts (i.e., the secret decryption key is required for an entity to learn about the data).

The computed set of indices use unique identifiers to categorize the data stream, and can include both primary and secondary identifiers for increasing efficiency of search algorithms, according to some embodiments. In some embodiments, given an input string of arbitrary length, the index generator 310 returns a monotonically increasing list of indices such that the index $i_0=0$ and $i_k=|s|$. After generating the set of indices, the index generator 310 provides the set of indices and the encrypted data stream to the segmenter 320.

The segmenter 320, in some embodiments, uses a segmentation function (e.g., derive function) to derive a set of encrypted segments from the encrypted data stream. That is, given a file (e.g., encrypted data stream) and a set of indices, the segmentation function outputs the set of encrypted segments. In addition to the set of encrypted segments, the segmenter 320 also computes a corresponding set of digests (e.g., hashes) for the set of encrypted segments.

For each encrypted segment (of arbitrary length) in the set of encrypted segments, the segmenter 320 returns a string of a fixed length, with that string of fixed length being the digest for that encrypted segment. Each digest is fixed size numeric representation of the contents of a segment, computed by, e.g., a hash function. The digest can be encrypted, in some embodiments, forming a digital signature. Encryption conceals the contents of the plaintext data, while the digest is a special kind of hash that acts as a fingerprint for the data, according to some embodiments. In some embodiments, if the segment digest is encrypted with a private key, this can be used as a digital signature to ensure it came from a particular source. After the set of encrypted segments and corresponding set of digests have been output by the segmenter 320, the segmenter 320 passes the set of encrypted segments and set of digests to the TRE module 330.

The TRE module 330 is configured to identify and remove duplicate segments in order to avoid sending duplicate segments of data. In some embodiments, the duplicate segments include both segments that are duplicates of each other within the data stream, as well as segments that are duplicates of segments known to the receiver (i.e., destination) and stored in a segment cache of the receiver. As such, the TRE module 330 identifies both segments that are duplicates within the data stream, and segments that are duplicates of the segments already in possession of the receiver.

In some embodiments, the TRE module identifies the segments already in possession of the receiver by sending a short digest that uniquely identifies the contents of each segment to the receiver, and subsequently receiving a list of segment digests that the receiver was unable to find in its local segment cache. In other embodiments, the receiver provides a probabilistic data filter (e.g., Bloom filter) to the cloud gateway for use in identifying potential duplicate segments. Once the TRE module 330 has identified the duplicate segments, the TRE module 330 replaces each duplicate segment with the segment's corresponding digest, thereby reducing the amount of data to be transmitted to the receiver. Once the TRE operation is complete, the TRE module 330 provides the encrypted data stream, that is now a combination of segments and digests, to the compression module 340.

The compression module 340 uses a lossless compression function that eliminates redundancies on a smaller scale using a dictionary to replace repeated series of bytes with shorter ones, according to some embodiments. An example of such a compression function used by the compression module 340, in some embodiments, is the LZ4 algorithm, which can provide a compression ratio of 2 and above at speeds of 1 GB per second and above on a single CPU core, in some embodiments. In some embodiments, the compression module 340 can offer compression services that adjust the compression level based on the WAN's network state, and, in some embodiments, based on application data.

Because the segments are encrypted, the compression is performed using the public evaluation key, which allows the encrypted segments to be compressed without the need for any decryption. In some embodiments, the compression module performs the compression operation on each encrypted segment by using a public evaluation key to decrypt, compress, and reencrypt each segment. In some such embodiments, the public evaluation key is used in an FHE encryption scheme to perform this decryption/encryption operation. The compression module, in some embodiments, computes ECF=FHE.Eval(ek, EF, compress) where ek is the evaluation key, EF is the encryption file, and ECF is the encrypted compressed file. After the series of segments and digests have been compressed into a WAN-optimized encrypted data stream, the compression module 340 provides the WAN-optimized encrypted data stream to the QoS scheduling module 350, which schedules the WAN-optimized encrypted data stream for forwarding to its destination (i.e., receiver).

FIG. 4 conceptually illustrates another a diagram of a WAN optimizer of some embodiments that is implemented in a cloud gateway. Unlike the WAN optimizer 305 of FIG. 3, the WAN optimizer 405 in FIG. 4 only performs a subset of the WAN optimization operations. As shown, the diagram 400 includes both a sender 465 (e.g., a source machine) and a gateway 460, with the various WAN optimization operations being split between these two elements. The sender 465 includes the segmenter 420 and the TRE module 430, while the gateway 460 includes a WAN optimizer 405 that includes the index generator 410 for the segmenter, the compression module 440, and the QoS scheduling module 450.

In this example, the workflow starts with the sender 465 providing an encrypted data stream to the WAN optimizer 405 in the gateway 460, which is then received by the index generator 410. The index generator 410 computes a set of indices for the encrypted data stream using a public evaluation key and evaluation function provided by either the sender 465 (i.e., source) or receiver (not shown) of the encrypted data stream, as also described above. However, unlike the index generator 310 described above, the index generator 410 then returns the computed set of indices to the sender 465 where the segmenter 420 resides.

At the sender 465, the segmenter 420 uses the set of indices generated by the index generator 410 to derive a set of encrypted segments from the encrypted data stream and to compute a set of digests corresponding to the set of encrypted segments. Though the segmenter 420 performs its segmentation operation at the sender 465 rather than in the WAN optimizer 405 at the gateway 460, the segmentation operation is the same as described above for the segmenter 320. As such, after the set of encrypted segments and set of digests are derived and computed, the segmenter 420 provides them to the TRE module 430 on the sender 465.

In some embodiments, the TRE module 430 on the sender 465 performs the same operations as described above for the TRE module 330. In other embodiments, both the sender 465 and the WAN optimizer 405 on the gateway 460 have a respective TRE module 430, such that a portion of the TRE operation (e.g., removing segments that are duplicates of segments known to the receiver) is performed at the sender 465 and another portion of the TRE operation (e.g., removing segments that are duplicates of other segments in the encrypted data stream) is performed by the WAN optimizer 405 at the gateway 460. In some such embodiments, the portion of the TRE operation performed by the WAN optimizer 405 at the gateway 460 also includes TRE for data streams that are also aggregated at the gateway 460.

For the embodiments in which all of the TRE operations are performed by the TRE module 430 at the sender 465, the TRE module 430 replaces any duplicate segments (i.e., segments known to the receiver and repeat segments within the data stream) with their corresponding digests and forwards the encrypted segments and digests to the WAN optimizer 405 at the gateway 460 where the encrypted segments and digests are then received by the compression module 440. As will be described in the embodiments below, the TRE module 430 of some embodiments performs an additional operation to replace duplicate segments with encrypted values that map to said duplicate segments in order to provide an added layer of security and to prevent the gateway 460 from being able to deduce any information from, e.g., repeats of the same digest in the encrypted data stream.

Once the encrypted segments and digests (or encrypted values) are received at the compression module 440, the compression module 440 performs its compression operation on the encrypted segments and digests (or encrypted values) to produce a WAN-optimized encrypted data stream for forwarding to the destination (i.e., receiver). The compression module 440 then provides the WAN-optimized encrypted data stream to the QoS scheduling module 450 for scheduling for delivery to the destination according to QoS associated with the WAN-optimized encrypted data stream.

In some embodiments, as mentioned above, SD-WAN cloud gateways are equipped with WAN optimizers and configured as aggregation points for various geographical regions and, as such, receive data streams from edge FEs operating at different branch sites in the various geographical regions for aggregation, optimization, and forwarding to a centralized datacenter. In some such embodiments, while the SD-WAN cloud gateways operate similar to hubs for their respective geographical regions to send data between the edge FEs in the geographical region and the centralized datacenter, the SD-WAN cloud gateway also operate as spokes in a hub-and-spoke architecture with the centralized datacenter.

Figure 5:
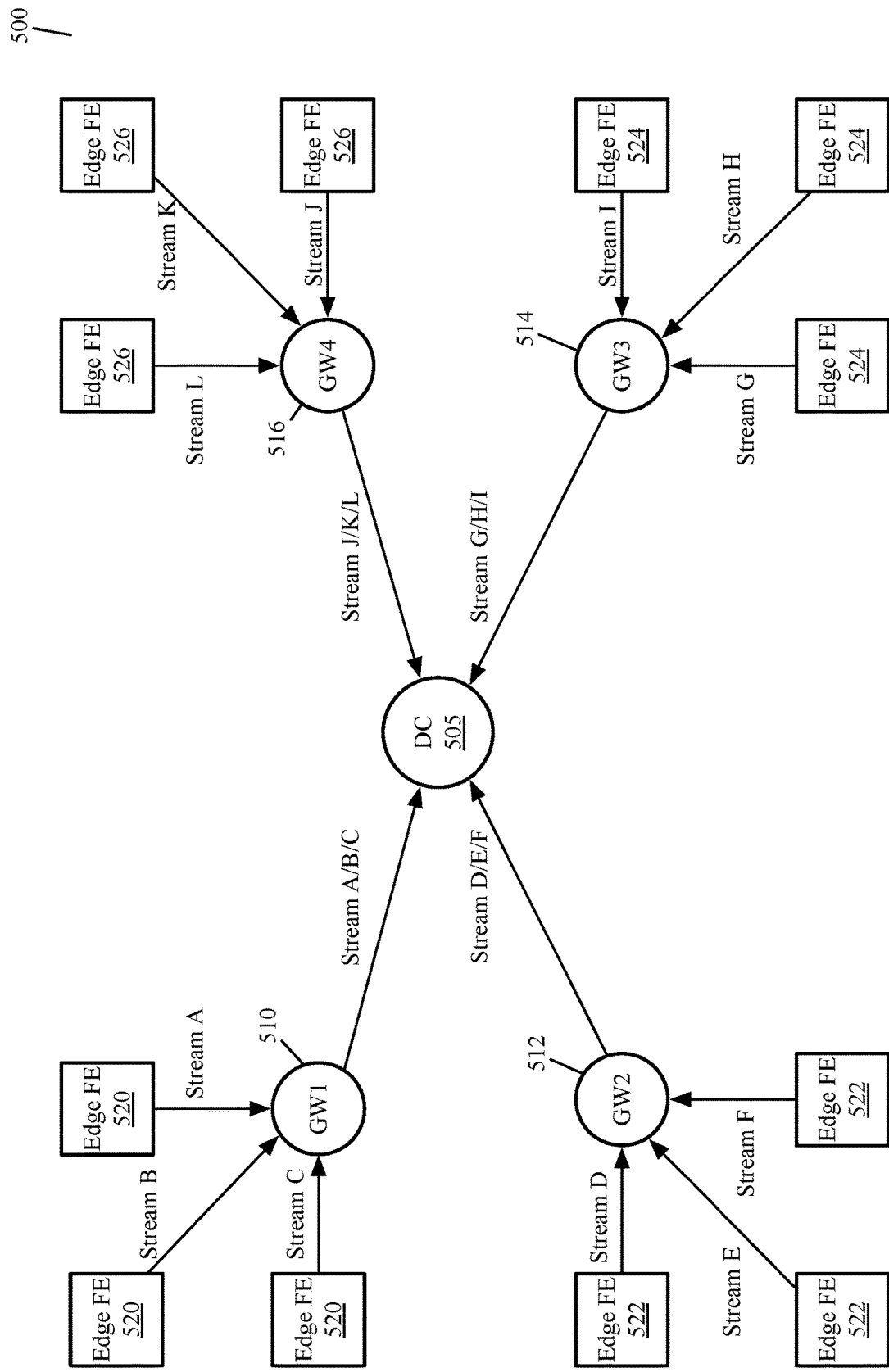
FIG. 5 conceptually illustrates a network of some embodiments that utilizes a hub-and-spoke architecture for aggregating, optimizing, and forwarding data traffic at a set of gateway routers and forwarding the aggregated data traffic to a centralized datacenter location (i.e., a centralized hub).

FIG. 5 conceptually illustrates a network of some embodiments that utilizes a hub-and-spoke architecture for aggregating, optimizing, and forwarding data traffic at a set of gateway routers and forwarding the aggregated data traffic to a centralized datacenter location (i.e., a centralized hub). As shown, the network 500 includes a centralized datacenter 505, a set of gateway routers 510-516, and multiple edge routers 520-526. Each gateway router 510-516 is deployed in a different geographical region 530-536 at which a different set of edge routers 520-526 reside.

In this example, the first region 530 includes gateway router 510 and a set of edge routers 520, the second region 532 includes gateway router 512 and a set of edge routers 522, the third region 534 includes gateway router 514 and a set of edge routers 524, and the fourth region 536 includes gateway router 516 and a set of edge routers 526, as shown. Each gateway router 510-516 is equipped with a WAN optimizer, like the WAN optimizers described above. The WAN-optimizer described in the embodiments herein is a distributed remote applications global optimization network ("DRAGON") that provides traffic redundancy elimination (TRE) and compression services for optimizing data streams forwarded by the gateway router (i.e., east-west traffic). In some embodiments, DRAGON is a Saas (software as a service) platform that is slotted above a service provider's SASE (secure access service edge) service, used on top of a pathway network that utilizes network infrastructure of public clouds to create auto-scale, software-only, corporate WAN overlay networks across the globe in other embodiments, or implemented as a stand-alone appliance in still other embodiments. DRAGON will be referred to below as a WAN optimizer.

Rather than having the central hub datacenter 505 perform all of the aggregation for data streams from each of the edge routers 520-526, the edge routers 520-526 are configured to send their data streams to their respective gateway router 510-516, which are each equipped with a WAN optimizer, deployed to their respective region 530-536. The gateway routers 510-516 then perform aggregation and WAN optimization operations on the data streams in order to each send a single, optimized, compressed data stream to the centralized datacenter 505 for final aggregation and processing. Because each gateway router 510-516 sends a single, aggregate, optimized data stream rather than each edge router 520-526 sending an individual data stream to the centralized datacenter, the cost of sending the data streams is significantly reduced, according to some embodiments.

For instance, each edge FE 520-526 sends a respective stream A-L to their assigned gateway 510-516, as shown. The WAN optimizers (not shown) that each of the gateways 510-516 is equipped with then performs aggregation and optimization operations on the received data streams to produce a single, WAN-optimized data stream. As illustrated, the gateway 510 sends a single stream A/B/C to the centralized datacenter 505, the gateway 512 sends a single stream D/E/F to the centralized datacenter 505, the gateway 514 sends a single stream G/H/I to the centralized datacenter 505, and the gateway 516 sends a single stream J/K/L to the centralized datacenter 505. Once the centralized datacenter 505 receives all of the streams A/B/C, D/E/F, G/H/I, and J/K/L, the centralized datacenter 505 performs an aggregation operation to combine the streams into a single model.

Each of the streams A-L sent by an edge FE 520-526 is an update stream, in some embodiments, for distributed and federated learning applications, which the centralized datacenter 505 collects and aggregates. As the centralized datacenter 505 receives these update streams, which each include local parameters updates computed by the edge FEs from which they originate, in some embodiments, the centralized datacenter 505 uses the update streams to update and train a machine learning model. By pushing a portion of the aggregation process to the gateways 510-516, and implementing the WAN optimizer in the gateways 510-516, bandwidth is significantly reduced and training rounds (i.e., rounds of sending and aggregating update streams) are shortened. As a result, the training of these models can occur more rapidly while also reducing the computations performed at the centralized datacenter 505.

Figure 6:
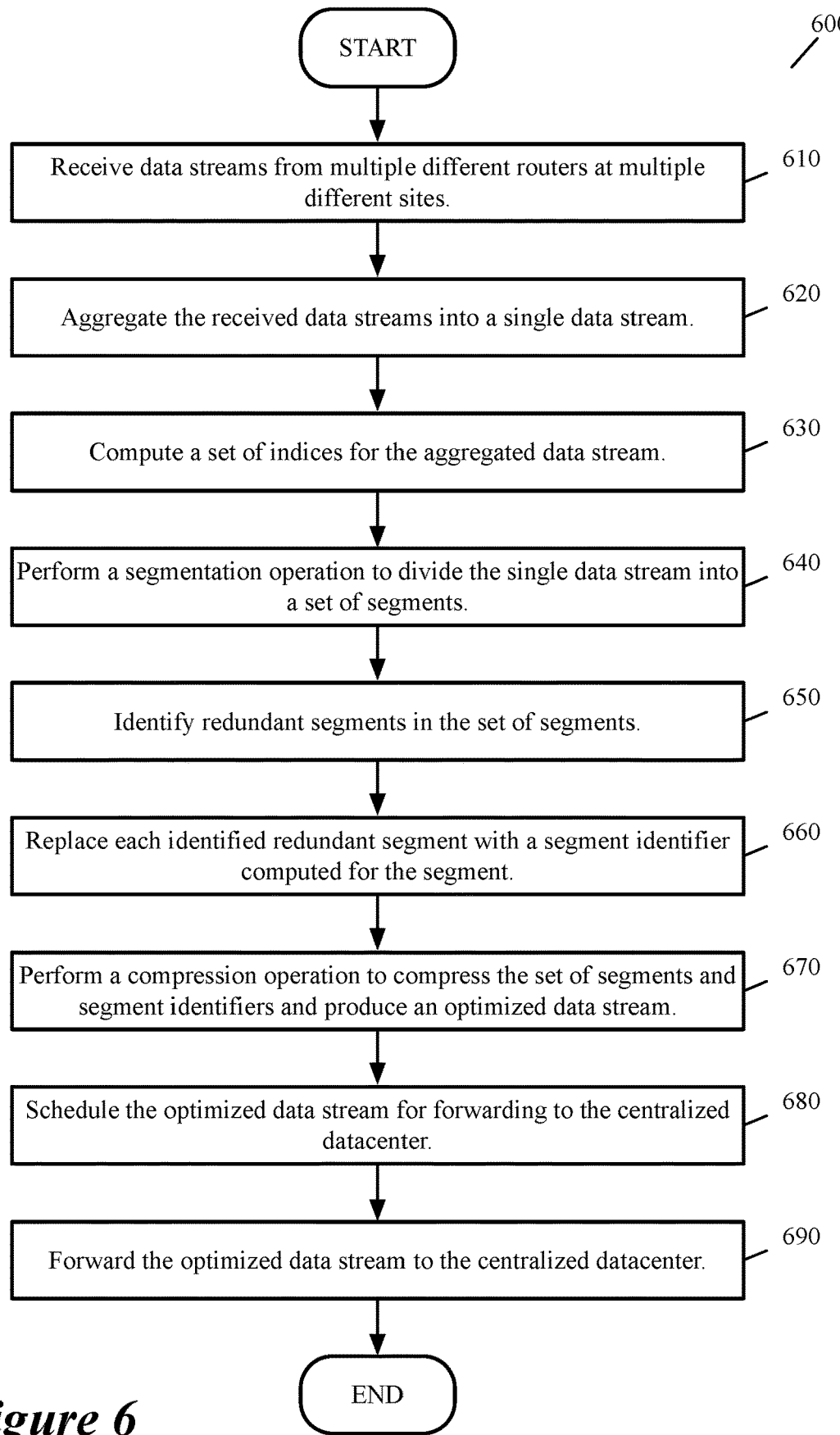
FIG. 6 conceptually illustrates a process performed by WAN-optimizer-equipped gateways deployed to different geographical regions in a hub-and-spoke architecture around a centralized datacenter, in some embodiments.

FIG. 6 conceptually illustrates a process performed by WAN-optimizer-equipped gateways deployed to different geographical regions in a hub-and-spoke architecture around a centralized datacenter, in some embodiments. The process 600 starts when the gateway receives (at 610) data streams from multiple different routers at multiple different sites. For instance, each of the gateways 510-516 in the SD-WAN 500 receives data streams from the edge FEs 520-526 in their respective regions. In some embodiments, each data stream from each edge FE 520-526 (i.e., from each edge router) is an updates stream that includes local parameters updates computed by the edge FE.

The process 600 aggregates (at 620) the received data streams into a single data stream. The WAN optimizer 215, for example, receives updates from each of the edge FEs 230-234 and outputs an aggregated and optimized updates stream that includes the updates received from each of the edge FEs 230-234. In some embodiments, the WAN optimizer—equipped gateways perform the aggregation in a same manner and for the same reasons as a smart hardware switch deployed in a datacenter. That is, each gateway sits in the datapath between the edge FEs and the centralized datacenter in order to perform part of the aggregation that would otherwise be performed at the centralized datacenter. As a result, multiple data streams can be aggregated into a single data stream, thereby also reducing the cost of sending the data to the centralized datacenter as only one stream is being sent from each region (i.e., one stream of data is exiting the public cloud).

The process 600 computes (at 630) a set of indices for the aggregated data stream. The WAN optimizer 305, for instance, includes an index generator 310 for computing sets of indices for data streams received at the gateway in which the WAN optimizer is implemented. The computed set of indices are for use in the segmentation and TRE operations that will be subsequently performed on the aggregated data stream, according to some embodiments. The set of indices includes unique identifiers to categorize the data stream. In some embodiments, the set of indices includes primary identifiers and secondary identifiers. In some such embodiments, the primary identifiers are guaranteed to be free of duplicate identifiers, whereas the secondary identifiers may include duplicate identifiers.

The process 600 performs (at 640) a segmentation operation to divide the single data stream into a set of segments. As described above, after the index generator of some embodiments computes the set of indices, it provides the indices and the data stream to a segmenter. The segmenter then uses the indices to derive a set of segments from the data stream as well as the corresponding set of digests, with each segment having a respective corresponding digest. In some embodiments, the WAN optimization operations may be split between the gateway's WAN optimizer and the sources of the data streams, such as the implementation described above for FIG. 4, and the gateway receives the data streams after these data streams have already been segmented at their sources.

The process 600 identifies (at 650) redundant segments in the set of segments. The TRE module of the WAN optimizer implemented in the gateway performs redundant segment identification, according to some embodiments. The redundant segments can include duplicates within the data stream, as well as segments that are already known to the receiver (e.g., the centralized datacenter). The TRE module identifies the segments already known to the receiver using a probabilistic data filter provided by the receiver that lists all segments (probably) known to the receiver in some embodiments, or by sending a digest to the receiver to request a list of segments from the digest that are unknown to the receiver, as also described above.

After the redundant segments have been identified, the process 600 replaces (at 660) each identified redundant segment with a segment identifier computed for the segment. The segment identifiers used to replace the redundant segments are the digests computed by the segmenter during the segmentation operation, according to some embodiments. As such, when the data stream is received by the receiver, the receiver can use its segment cache to look up the segment identifiers in the data stream, retrieve the corresponding segments from the segment cache, and reinsert the retrieved segments in the data stream in place of the segment identifiers, thereby reconstructing the data stream in full, according to some embodiments.

The process 600 performs (at 670) a compression operation to compress the set of segments and segment identifiers and produce an optimized data stream. The WAN optimizer of some embodiments includes a compression module for performing compression operations on segmented, TRE'd data streams in order to produce WAN-optimized data streams for forwarding to their destination. As mentioned above, the compression module of some embodiments uses a lossless compression function that eliminates redundancies on a smaller scale (e.g., compared to the TRE operation) using a dictionary to replace repeated series of bytes with shorter ones, resulting in a compressed (e.g., zipped) data stream that is WAN-optimized.

The process 600 schedules (at 680) the optimized data stream for forwarding to the centralized datacenter. The WAN optimizer implemented in the gateway of some embodiments includes a QoS scheduling module for scheduling each data stream according to QoS associated with the data stream. In some embodiments, the QoS scheduling module maps segments of the WAN-optimized data stream to internal forwarding queues based on QoS information associated with the data stream. Higher priority traffic queues are sent out before lower priority traffic queues according to a queueing scheme, according to some embodiments.

The process 600 then forwards (at 690) the optimized data stream to the centralized datacenter. That is, once the scheduled WAN-optimized data stream has reached the front of the queue, the gateway forwards the WAN-optimized data stream to the centralized datacenter, where it is reconstructed and aggregated with other WAN-optimized data streams sent to the centralized datacenter for further processing. Following 680, the process 600 ends.

Figure 7:
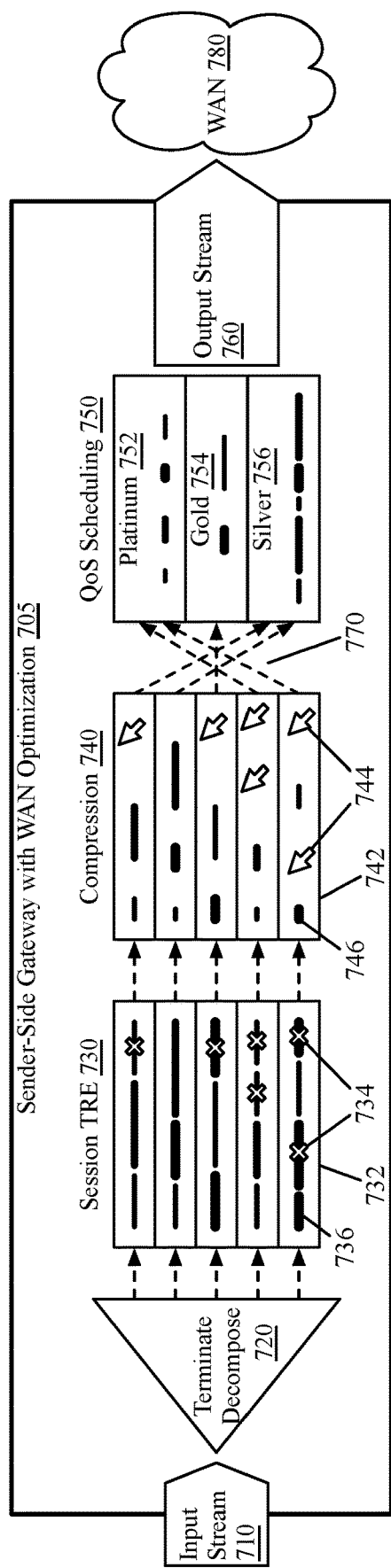
FIG. 7 conceptually illustrates an example diagram of a sender-side gateway (i.e., source-side gateway) equipped with a WAN optimization pipeline, in some embodiments.
Figure 8:
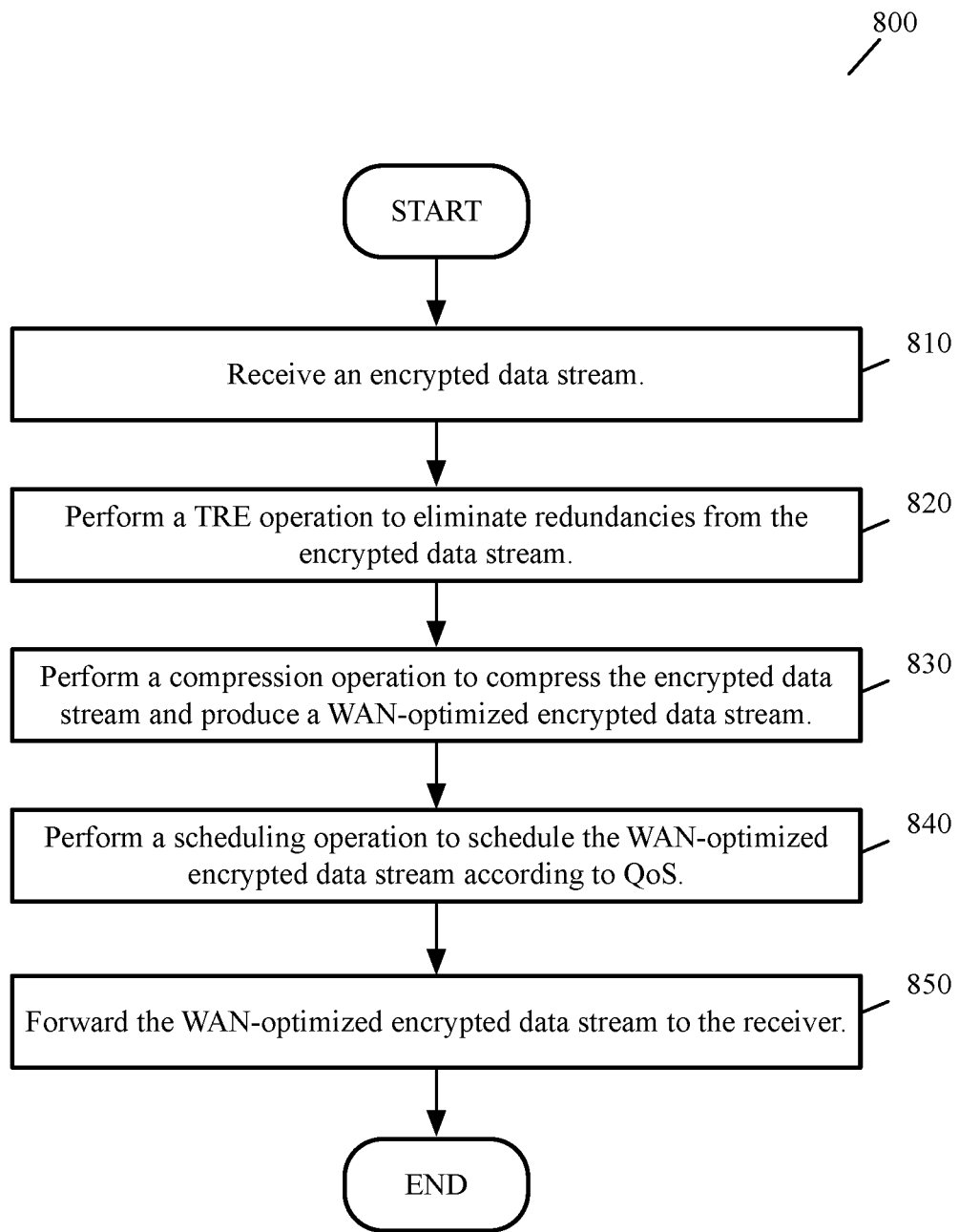
FIG. 8 conceptually illustrates a process performed in some embodiments by a sender-side gateway equipped with a WAN optimization pipeline.

In some embodiments, gateways equipped with WAN optimizers are deployed for both sources and destinations of data streams, with each gateway processing encrypted data streams sent between the sources and destinations without decrypting the encrypted data streams. FIG. 7 conceptually illustrates an example diagram of a sender-side gateway (i.e., source-side gateway) equipped with a WAN optimization pipeline, in some embodiments. In this example, the data stream has already been segmented. As shown, the sender-side gateway 705 includes a session TRE stage 730, a compression stage 740, and a QoS scheduling stage 750. FIG. 7 will be further described below by reference to FIG. 8, which conceptually illustrates a process performed in some embodiments by a sender-side gateway equipped with a WAN optimization pipeline.

The process 800 starts when the sender-side gateway receives (at 810) an encrypted data stream. When data streams are sent to the sender-side gateway 705, for instance, the data streams enter the gateway 705 as input streams 710, the connection is terminated at the termination point 720, and each data stream is placed in a respective buffer in the session TRE stage 730. The terminated connection, in some embodiments, is a TCP (transmission control protocol) connection or any other connection-oriented or connectionless protocol used by the source of the data stream. Also, it should be noted that in this example, the data stream has already been segmented by the source of the data stream.

The process 800 performs (at 820) a TRE operation to eliminate redundancies from the encrypted data stream. For instance, the TRE stage 730 in this example is processing 5 streams, with one stream in each of 5 buffers. In some embodiments, some data streams may not include any duplicate segments, and as such, the TRE operation does not result in any modifications to the data stream. As shown, four of the five data streams being processed at the session TRE stage 730 include redundant segments, as indicated by the white X placed over certain segments. For instance, in the bottom buffer 732, two segments 734 have been identified as duplicate segments.

The process 800 then performs (at 830) a compression operation to compress the encrypted data stream and produce a WAN-optimized encrypted data stream. In the sender-side gateway 705, after the redundant segments have been eliminated, each data stream is passed to a respective buffer at the compression stage 740, which performs a compression operation on each remaining segment in each stream. In the bottom buffer 742 at the compression stage 740, the segments 734 have been eliminated as indicated by the white cursor arrows 744 in their place, while the remaining segments such as segment 746 has been compressed, as illustrated by the size different between the uncompressed segment 736 and the compressed segment 746.

The process 800 performs (at 840) a scheduling operation to schedule the WAN-optimized encrypted data stream according to QoS. Following the compression stage 740 in the sender-side gateway 705, for example, each optimized data stream is placed in a queue of the QoS scheduling stage 750 according to QoS associated with the data stream. The QoS scheduling stage 750 includes three queues—namely a platinum queue 752, a gold queue 754, and a silver queue 756. As indicated by the arrows 770, the segments from the top two buffers of the compression stage 740 have been scheduled in the silver queue 756, the segments from the middle buffer of the compression stage have been scheduled in the gold queue 754, and the segments from the bottom two buffers of the compression stage 740 have been scheduled in the platinum queue 752.

Finally, the process 800 forwards (at 850) the WAN-optimized encrypted data stream to the receiver (i.e., destination). At the QoS scheduling stage 750, as each queue 752-756 is ready to be forwarded, the data streams are sent as output streams 760 to traverse the WAN 780 toward their destinations. Following 850, the process 800 ends.

Figure 9:
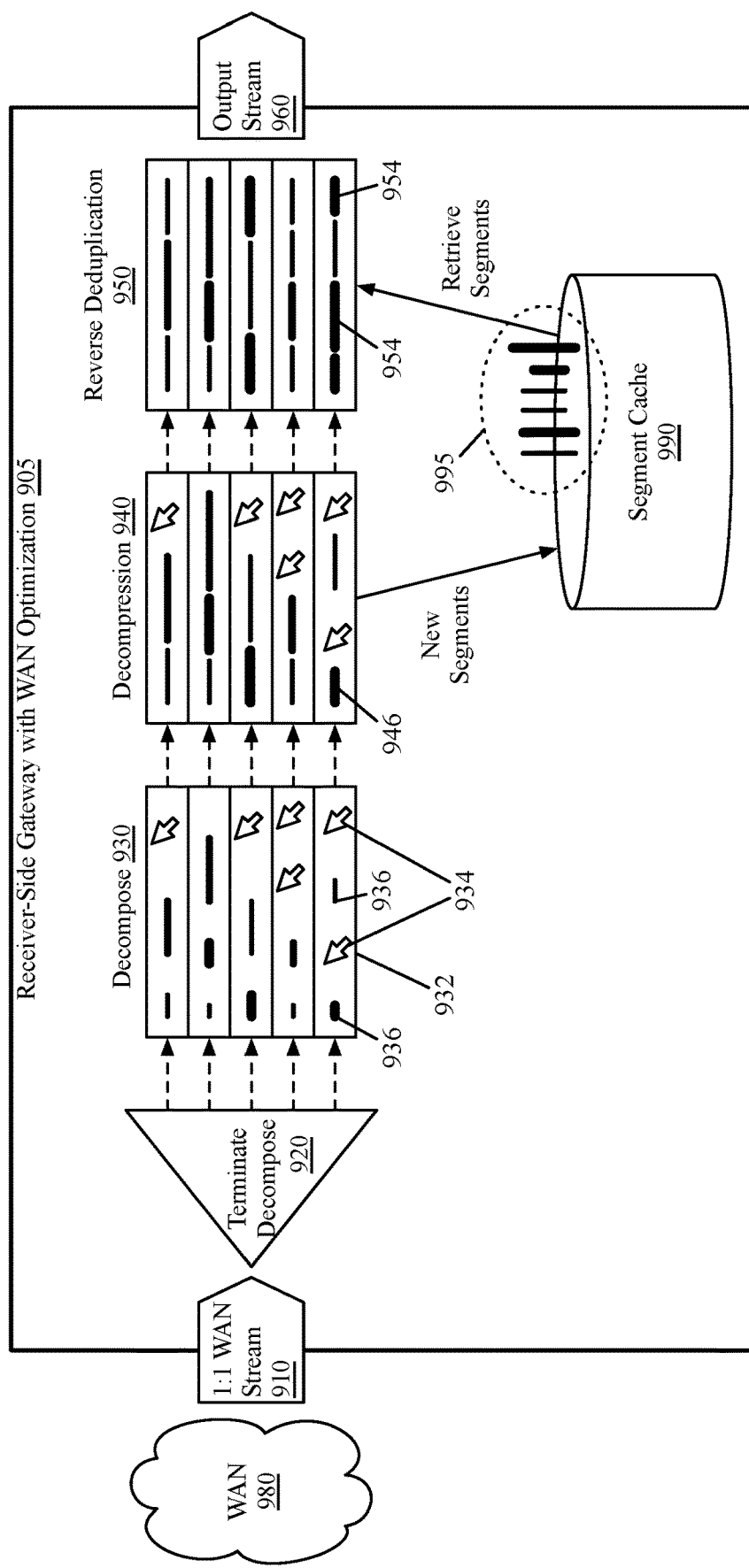
FIG. 9 conceptually illustrates an example diagram of a receiver-side gateway (i.e., source-side gateway) equipped with a WAN optimization pipeline, in some embodiments.
Figure 10:
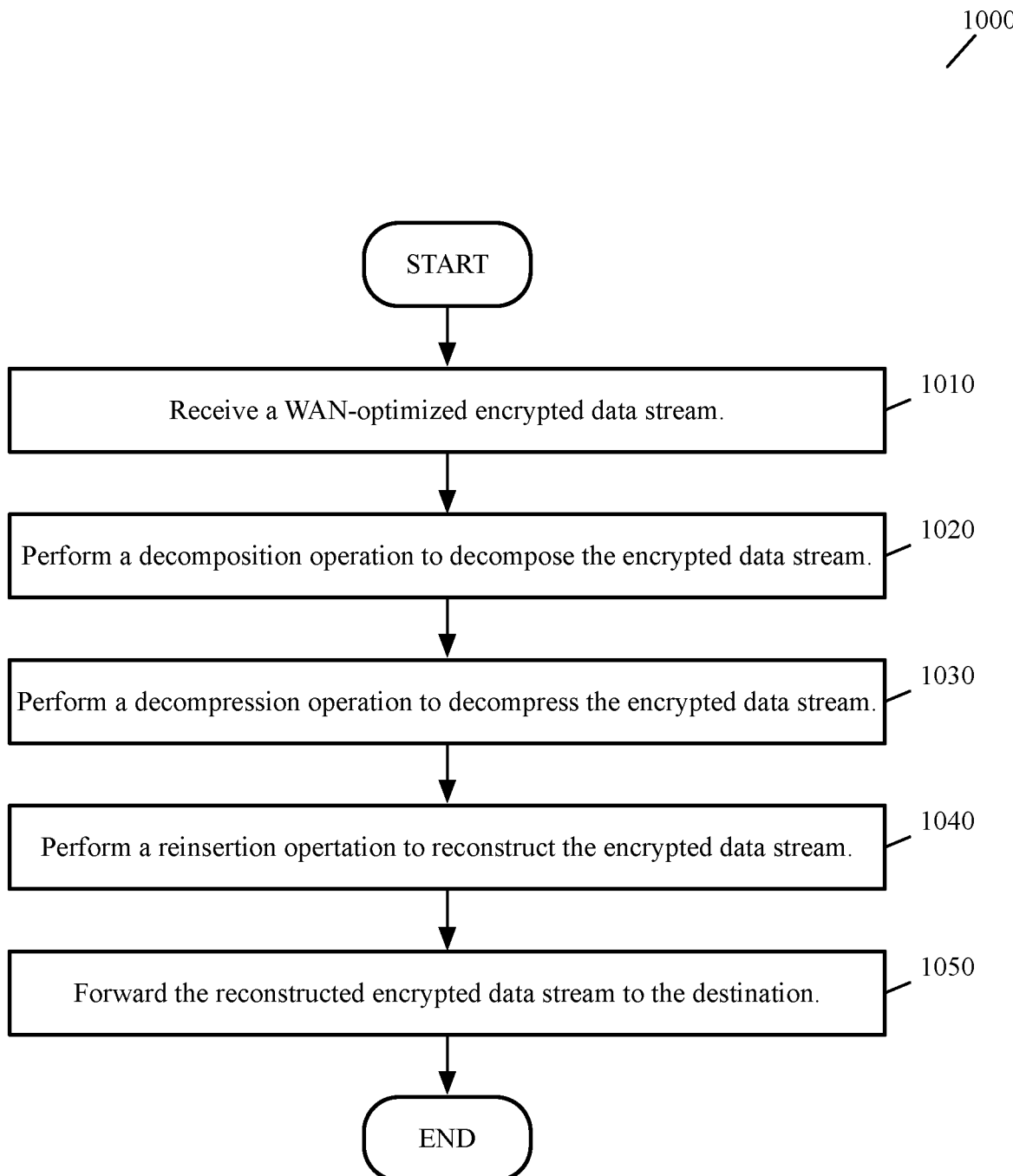
FIG. 10 conceptually illustrates a process performed in some embodiments by a receiver-side gateway equipped with a WAN optimization pipeline.

FIG. 9 conceptually illustrates an example diagram of a receiver-side gateway (i.e., source-side gateway) equipped with a WAN optimization pipeline, in some embodiments. The receiver-side gateway 905 includes a decompose stage 930, a decompression stage 940, a reverse deduplication stage 950, and a segment cache 990, as shown. FIG. 9 will be further described below by reference to FIG. 10, which conceptually illustrates a process performed in some embodiments by a receiver-side gateway equipped with a WAN optimization pipeline.

The process 1000 starts when the receiver-side gateway receives (at 1010) a WAN-optimized data stream. The receiver-side gateway 905, for instance, receives WAN-optimized encrypted data streams sent through the WAN 980. These data streams enter the gateway as ingress streams at 910 and the connections are terminated at 920 at which point they are added to buffers of the decompose stage 930 for per-flow handling.

The process 1000 performs (at 1020) a decomposition operation to decompose the encrypted data stream. That is, the decomposition stage 930 breaks each received data stream down into its segments for further processing. As shown, the bottom buffer 932 of the decompose stage 930 includes two compressed segments 936, while the white cursor arrows 934 represent the segments that may have been replaced by segment digests or other types of identifiers during the TRE operation performed at the source of the data stream and/or sender-side gateway. After the decompose stage 930 has decomposed the encrypted data stream, the segments are passed to the buffers of the decompression stage 940.

The process 1000 performs (at 1030) a decompression operation to decompress the encrypted data stream. As mentioned above, on the sender side, the data stream goes through a compression operation performed by a compression stage of the sender-side gateway. The compression operation, in some embodiments, is a lossless compression operation that eliminates redundancies on a smaller scale using a dictionary to replace repeated series of bytes with shorter ones. As such, the decompression stage 940 performs a decompression operation on the segments of the received data streams to reverse the compression performed on the segments and reintroduce any redundancies eliminated during the compression operation and replace the shorter series of bytes with the longer ones. For example, the compressed segment 936 is replaced with the decompressed segment 946, which is visible longer to illustrate the decompression.

In addition to decompressing the segments, the decompression stage 940 in some embodiments also adds new segments to the segment cache 990. In some embodiments, each full segment received at the receiver-side gateway 905 is assumed to be a new segment as any segments known to the receiver would have been replaced with digests or other encrypted values (e.g., encrypted values generated using a probabilistic encryption operation) during the TRE operation performed at the sender-side gateway. As such, once the segments have been decompressed, they are added to the segment cache 990, where they can be later retrieved for reinsertion into subsequent data streams that arrive with segment identifiers corresponding to these stored segments, in some embodiments. For any full segments that are determined to already exist in the segment cache 990, states for the segments are instead updated in the cache without storing duplicate segments. In some embodiments, each state is a data structure of type dictionary that maps digests to their corresponding segments such that the states are a list of links from digest 1 to segment 1 up through digest m through segment m, with each of the digests being of length n and the segments being of any length. The full segments are then passed to the buffers of the reverse deduplication stage 950.

The process 1000 performs (at 1040) a reinsertion operation to reconstruct the encrypted data stream. That is, for each segment identifier (e.g., digest or encrypted value) received in a data stream, the reverse deduplication stage 950 performs a lookup in the segment cache 990 and retrieves the full segments 995 for reinsertion into the appropriate data streams in place of the segment identifiers. For example, full segments 954 have been inserted where the white cursor arrows 934 previously acted as visual placeholders. Once the full segments have been reinserted, the encrypted data stream is reconstructed.

The process 1000 then forwards (at 1050) the reconstructed encrypted data stream to its destination. As shown, after a data stream has been reconstructed at the reverse deduplication stage 950 of the receiver-side gateway 905, the output stream 960 exits the gateway 905 toward the receiver. In some embodiments, the data stream is not delivered directly to its destination, but rather is forwarded to another forwarding element, such as an edge forwarding element at the edge of a branch site, which then forwards the encrypted data stream to its final destination. Following 1050, the process 1000 ends.

In some embodiments, a protocol is defined between the sender and receiver of a data stream regarding the segments that the receiver already has in its segment cache in order to prevent the sender from sending these known segments. As mentioned above, one such protocol is that the sender first sends a short digest, which acts as a segment identifier that uniquely identifies the content of the segment, of each segment in the input stream, and the receiver responds with a list of segment digests that it is unable to locate in its local segment cache, indicating to the sender that these segments should be sent to the receiver in full for the receiver to store in its segment cache for later use (e.g., for reinsertion operations when subsequent data streams send segment identifiers corresponding to the segment in lieu of sending the full segment). While this protocol decreases the number of full segments that the sender has to send the receiver as the sender will only need to send segments that are unknown to the receiver (i.e., not already stored in the segment cache), the protocol also increases the overhead as each segment digest must first be sent to the receiver to check if it is available in the receiver's segment cache, and, as such, incurs an RTT (round-trip time) latency for each segment that is not yet available in the segment cache (i.e., since the sender will wait for a response from the receiver before sending the segment in full).

Accordingly, in order to avoid the increased overhead, some embodiments instead enable the sender to learn the cache behavior of the receiver. For instance, if the sender is the only one sending segments to the receiver, and the sender has full knowledge of both the algorithm used by the receiver to evacuate old and/or unused segments as well as the size of the cache, then the sender can also know which of the segments that the sender has already sent are in the receiver's segment cache and which were already deleted. As such, the sender can, in some such embodiments, send segments that are missing from the receiver's segment cache in full without having to wait for the receiver's feedback regarding segments that may or may not be missing from its segment cache. Such a protocol would accomplish reducing the overhead of sending segment identifiers/digests for segments that the sender already knows are missing from the receiver's segment cache and would improve the latency for these segments.

However, this is not possible in cases where there are multiple senders sending to the same receiver so that the receiver can take advantage of similar segments between different streams of data coming in from different senders. The reason it is not possible is that the sender no longer has full knowledge of all the inputs to the receiver, even if it has full knowledge of the receiver's algorithm. As such, in some embodiments, to improve the sender's knowledge of which segments are contained in the receiver's segment cache is to send a summary of the segments in the segment cache from the receiver to each of the senders. The senders, in some such embodiments, would then consult this segment cache summary to determine whether or not a certain segment is available in the receiver's segment cache. For segments determined to be available in the segment cache according to the summary, a sender would only send the segment's identifier (e.g., digest), according to some embodiments. For segments determined to be unavailable in the segment cache according to the summary, in some embodiments, the sender would send the segment in full.

However, some such embodiments still do not provide the senders with full knowledge of the receiver's segment cache as the summary is only true for the moment it is constructed in the receiver. That is, between the time the summary is constructed and the time a sender wants to consult that summary, the segment cache content may have changed as segments may have been removed from the cache and new segments may have been added. For this reason, when a sender sends a segment in full, it may be redundant, in which case the receiver can just ignore the segment or simply update a "last-seen" timestamp for the segment in the segment cache, and when the sender sends only a segment identifier, the receiver might still be missing the corresponding segment and the control protocol between the sender and receiver must still contain a request for the full segment from the receiver to the sender. Accordingly, the goal in some such embodiments is to keep false negatives (i.e., when a sender falsely assumes a cache miss) to a low number, which in turn would reduce the redundant segments sent from the sender to the receiver as well as reduce the bandwidth requirements between the sender and receiver. Additionally, in some such embodiments, it is ideal to also keep false positives to a low number, which will reduce the latency for these segments and slightly reduce the overhead of sending segment identifiers instead of the entire segment, according to some embodiments.

Figure 11:
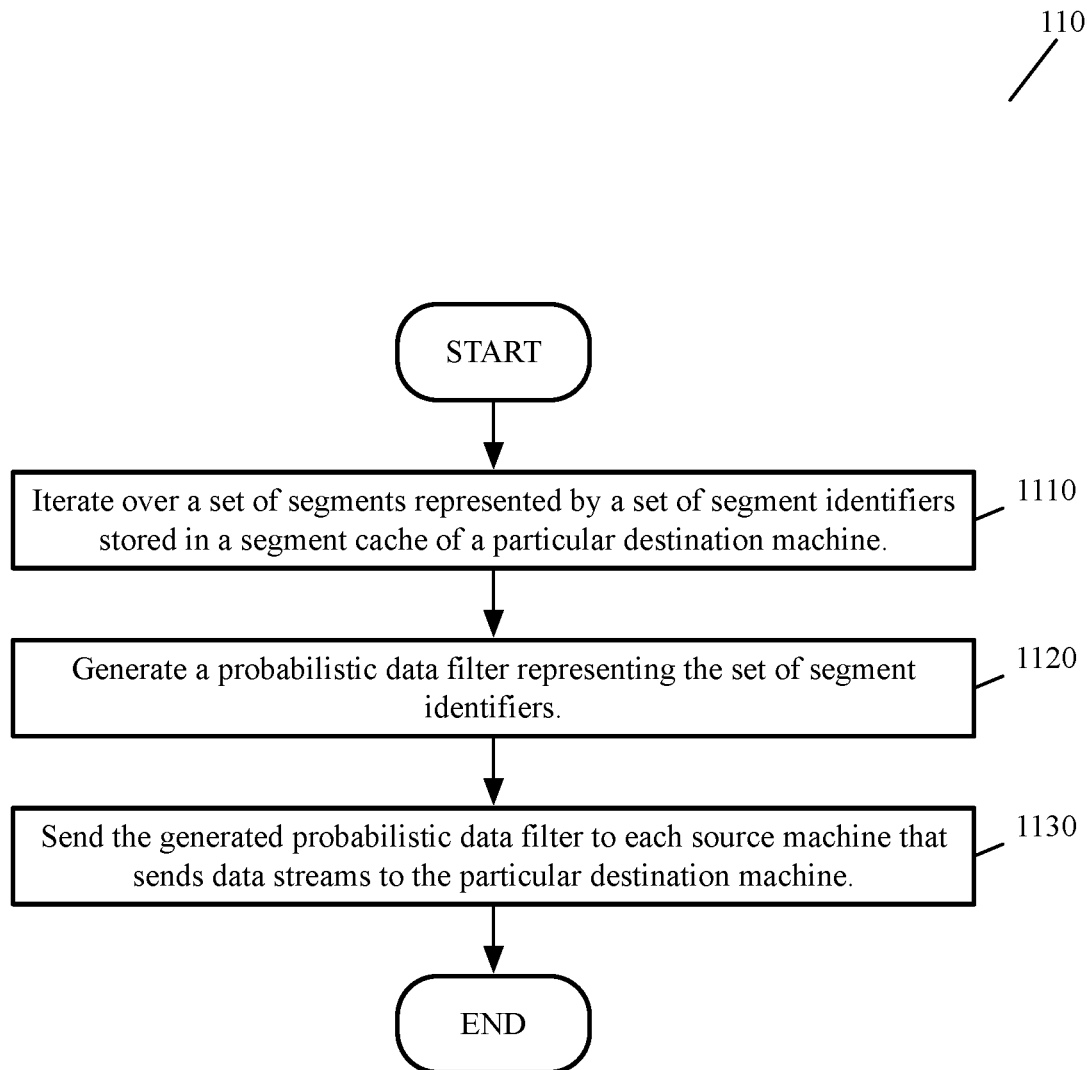
FIG. 11 conceptually illustrates a process performed by a receiver of some embodiments to generate such a probabilistic data filter.

In some embodiments, keep these numbers low, the receiver needs to periodically send the segment cache summary at a higher frequency, or at least send regular updates to the segment cache summary while also avoiding high increases in bandwidth consumption. As such, some embodiments utilize probabilistic data filters (e.g., Bloom filters) that are generated by the receiver and provided to each sender. As the receiver's segment cache experiences updates (e.g., deletion and/or addition of segments), the receiver in some such embodiments updates the probabilistic data filter and sends the updates to the senders to keep redundancies and requests for full segments to a minimum. FIG. 11 conceptually illustrates a process performed by a receiver of some embodiments to generate such a probabilistic data filter.

The process 1100 starts when the receiver iterates (at 1110) over a set of segments represented by a set of segment identifiers stored in a segment cache of a particular destination machine.

The process 1100 generates (at 1120) a probabilistic data filter representing the set of segment identifiers. In some embodiments, after generating the probabilistic data filter, the receiver also performs a compression operation on the generated probabilistic data filter to optimize it before sending.

Figure 12:
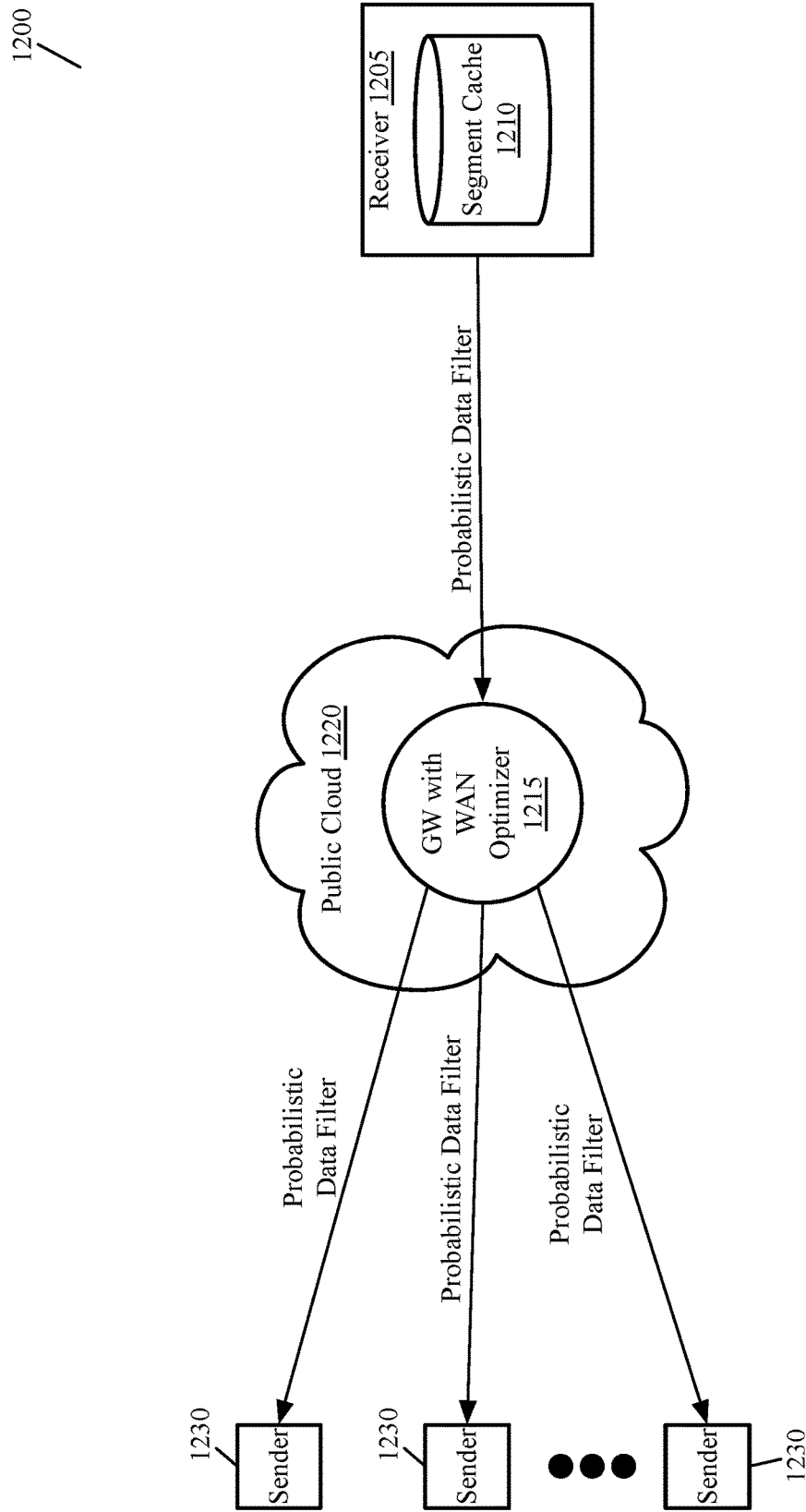
FIG. 12 conceptually illustrates a diagram in which a receiver sends a probabilistic data filter to a gateway and multiple senders.

The process 1100 sends (at 1130) the generated probabilistic data filter to each source machine that sends data streams to the particular destination machine. In some embodiments, when sending the probabilistic data filter to the senders, the receiver also sends the probabilistic data filter to any gateways that perform WAN optimization operations on data streams sent to the receiver for use by the gateways during the WAN optimization operations (e.g., TRE operations). For example, FIG. 12 conceptually illustrates a diagram in which a receiver sends a probabilistic data filter to a gateway and multiple senders. As shown, the diagram 1200 includes a receiver 1205, a gateway with a WAN optimizer 1215 that is deployed to a public cloud 1220, and multiple senders 1230.

The receiver 1205 includes a segment cache 1210 for storing segments it receives. After generating the probabilistic data filter, the receiver 1205 sends the probabilistic data filter to the gateway 1215 as shown. The gateway 1215 then forwards the probabilistic data filter to each of the senders 1230 for use in identifying segments likely to be in the segment cache 1210. As the senders 1230 forward data streams to the receiver 1205, the receiver 1205 updates its segment cache 1210, according to some embodiments. In addition to adding new segments, the receiver 1205, in some embodiments, also periodically may delete segments from the segment cache 1210. Based on these updates to the segment cache 1210, the receiver 1205 updates the probabilistic data filter and forwards the updates to the gateway 1215 and senders 1230.

Figure 13:
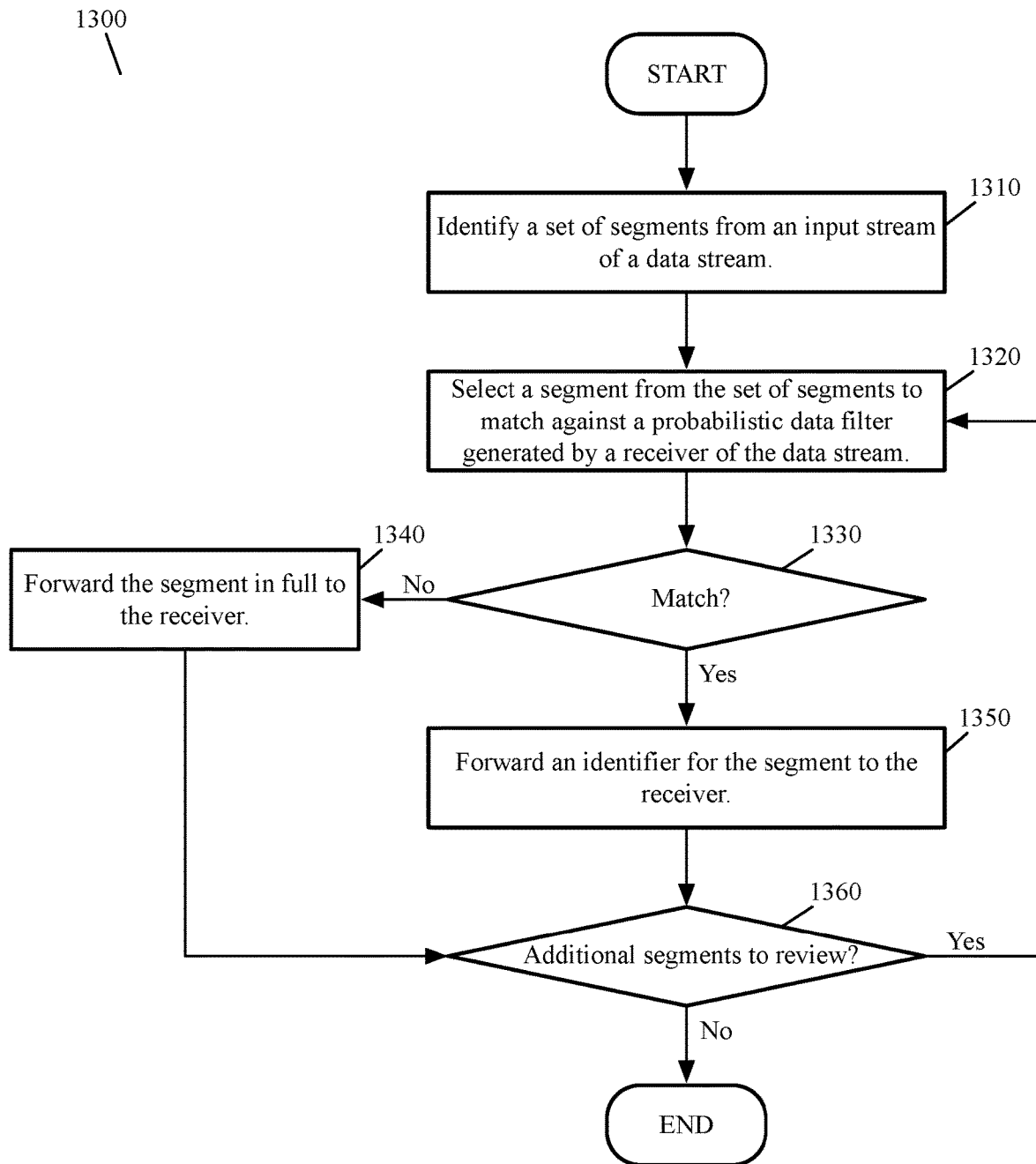
FIG. 13 conceptually illustrates a process for using the probabilistic data filter to determine whether a segment is in the segment cache of the receiver.

FIG. 13 conceptually illustrates a process for using the probabilistic data filter to determine whether a segment is in the segment cache of the receiver. The process 1300 is performed by a sender or gateway equipped with a WAN optimizer. The process 1300 starts when the sender identifies (at 1310) a set of segments from an input stream of a data stream. Like the embodiments described above, the data stream in some embodiments is an encrypted data stream of encrypted segments.

Figure 14:
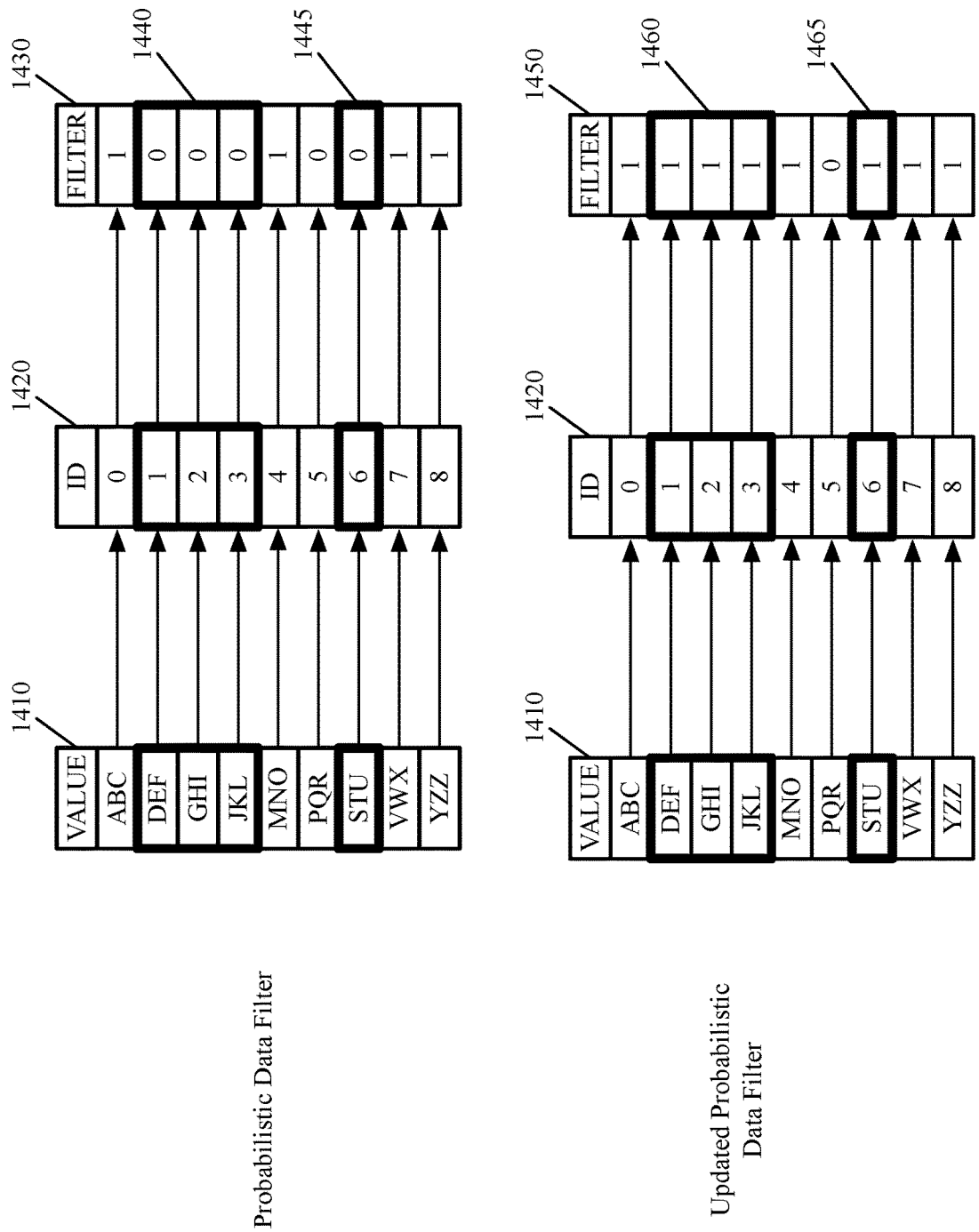
FIG. 14 conceptually illustrates simplified examples of a probabilistic data filter and an updated probabilistic data filter of some embodiments.

The process 1300 selects (at 1320) a segment from the set of segments to match against a probabilistic data filter generated by a receiver of the data stream. FIG. 14 conceptually illustrates simplified examples of a probabilistic data filter and an updated probabilistic data filter of some embodiments. As shown, the probabilistic data filter 1430 is generated from a set of values 1410 that map to a set of identifiers 1420. Only four of the values show cache hits according to the filter 1430. That is, only four of the values are probably in the segment cache of the sender at the time the filter 1430 was generated.

The process 1300 determines (at 1330) whether there is a match between the segment identifier and any segment identifiers included in the probabilistic data filter from the receiver. For instance, the sender can determine whether there is a cache hit or a cache miss for a value "STU" that corresponds to an identifier "6" using the filter 1430. As shown, the filter 1430 indicates a cache miss 1445 for the value "STU". As such, when the process 1300 determines that there is not a match (i.e., cache miss), the process transitions to forward (at 1340) the segment in full to the receiver. In some embodiments, probabilistic data filters, such as Bloom filters, do not include any false negatives. In other words, at the time the filter 1430 was generated, the value "STU" was definitely not in the segment cache, and thus the sender must send the full segment. Similarly, each of the values "DEF", "GHI", and "JKL", having the respective identifiers of "1", "2", and "3", are all cache misses 1440 according to the filter 1430. As mentioned above, if the receiver has updated its segment cache in the time between generating the probabilistic data filter and receiving the full segments from the sender to include any of the segments now sent by the sender, the receiver would discard the full segments and, in some embodiments, simply update timestamps for the segments in the cache.

As mentioned above, the receiver sends periodic updates to the probabilistic data filter as its cache is updated. For instance, the updated filter 1450 shows cache hits 1460 for the values "DEF", "GHI", and "JKL", as well as a cache hit 1465 for the value "STU". When the process 1300 determines that there is a match (i.e., cache hit), the process transitions to forward (at 1350) an identifier for the segment to the receiver. Using the example in FIG. 14, the sender would send identifiers "1", "2", "3", and "6" for each of the values "DEF", "GHI", "JKL", and "STU" based on the updated filter 1450. While false negatives are unlikely with the probabilistic data filter (i.e., they only occur if the cache has been updated since the filter was generated), false positives can occur and a cache hit is an indication that the segment is probably in the cache, rather than an assurance that the segment is definitely in the cache. As such, in some embodiments, the sender might send a segment identifier for a segment that is not actually in the cache. In some such embodiments, the receiver would send a request to the sender for the full segment.

The process 1300 then determines (at 1360) whether there are any additional segments to review. When there are additional segments to review (i.e., the last segment in the data stream has not yet been reviewed), the process returns to select (at 1320) a segment from the set of segments to match against the probabilistic data filter. Otherwise, when there are no additional segments to review, the process 1300 ends.

As described above, some embodiments implement WAN optimizers in gateways deployed to public gateways in order to optimize traffic between senders and receivers. In these embodiments, instead of sending the file in plain, the sender first encrypts the file (i.e., data stream) using a fully homomorphic encryption (FHE) scheme, which allows the gateway to run the segment algorithm on it even though the file is encrypted. The encrypted indices are returned back to the sender, who uses the encrypted indices to split the file and derive the segments which it then sends to the gateway for further optimization and forwarding, while ensuring the gateway does not see the content of the file. In some such embodiments, the information revealed to the gateway consists of the number of indices, the size of the segments, and their digests.

In the discussions below, the following notation will be used. For a string s, we denote by $|s|$ the length of s and its coordinates by $s_0, \ldots, s_{|s|-1}$. We write [a,b] to denote the set $\{a, a+1, \ldots, b\}$. A list $(a_0, \ldots, a_k)$ is monotonically increasing if $a_j < a_j+1$ for every $j \in [0, k-1]$. A concatenation of two strings $a \in \{0,1\}^n$ and $b \in \{0,1\}^m$ is denoted by $c = a \| b$ such that $c \in \{0,1\}^{n+m}$. It should be noted that the terms segment and chunk may be used interchangeably in the discussions below. Additionally, the algorithms used in the discussions below will include a chunk algorithm, a derive algorithm, a digest algorithm, and a cache algorithm.

The segmentation algorithm is given a string $s \in \{0,1\}^*$ of arbitrary length, and returns a monotonically increasing list of indices $i_0, \ldots, i_k \in [0, |s|]$ within s, such that $i_0 = 0$ and $i_k = |s|$. The derive algorithm is given a file F and a list of indices $i_0, \ldots, i_k$, and outputs the chunks $c_0, \ldots, c_{k-1}$ such that $c_j=(sl_j, \ldots, sl_j-1)$. The digest algorithm is given a string (chunk) $c \in \{0, 1\}^*$ of arbitrary length, and returns a string, called digest (or hash), of a fixed length n. A state is a data structure of type dictionary that maps digests to its corresponding chunks (i.e., segments). That is, a state is of the form $st=\{d_1 \to c_1, \ldots, d_m \to c_m\}$ where $d_i \in \{0, 1\}^n$ is a digest and $c_i \in \{0, 1\}^*$ is a chunk, such that digest($c_i$)=$d_i$. We use d∈st if d→c (with d=digest(c)) exists in st and d∉st otherwise. The cache algorithm is given a state st and a list ($m_0$, $m_1$, $m_2$, ...), where $m_i$ is a piece of information that may contain either a chunk or a digest, and returns an updates state st'. Let type ($m_i$) return chunk if $m_i$ contains a chunk, and otherwise return a digest.

Figure 15:
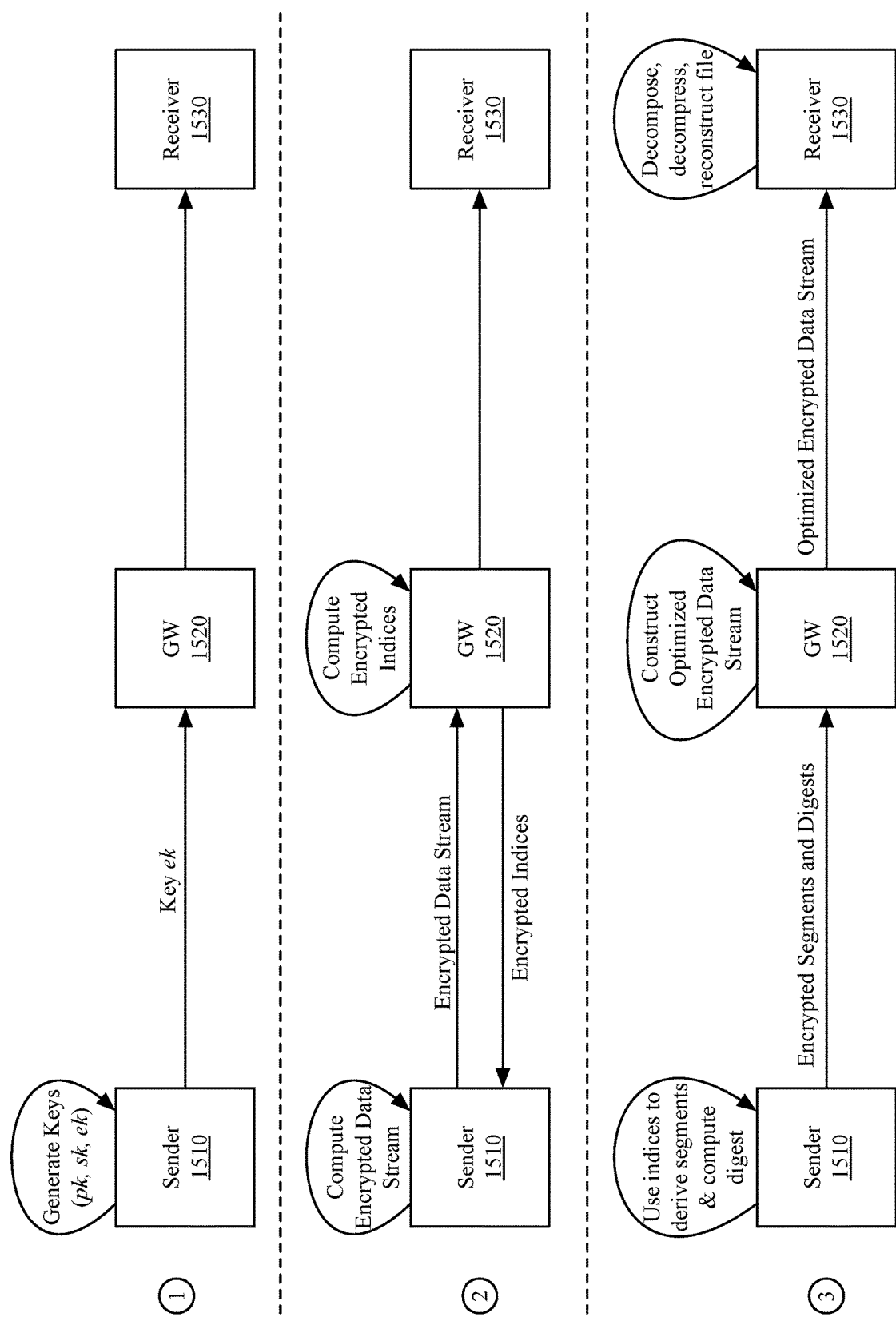
FIG. 15 conceptually illustrates a workflow between a sender, a gateway equipped with a WAN optimizer, and a receiver in some embodiments when sending an encrypted data stream from the sender to the receiver using a first FHE scheme.
Figure 16:
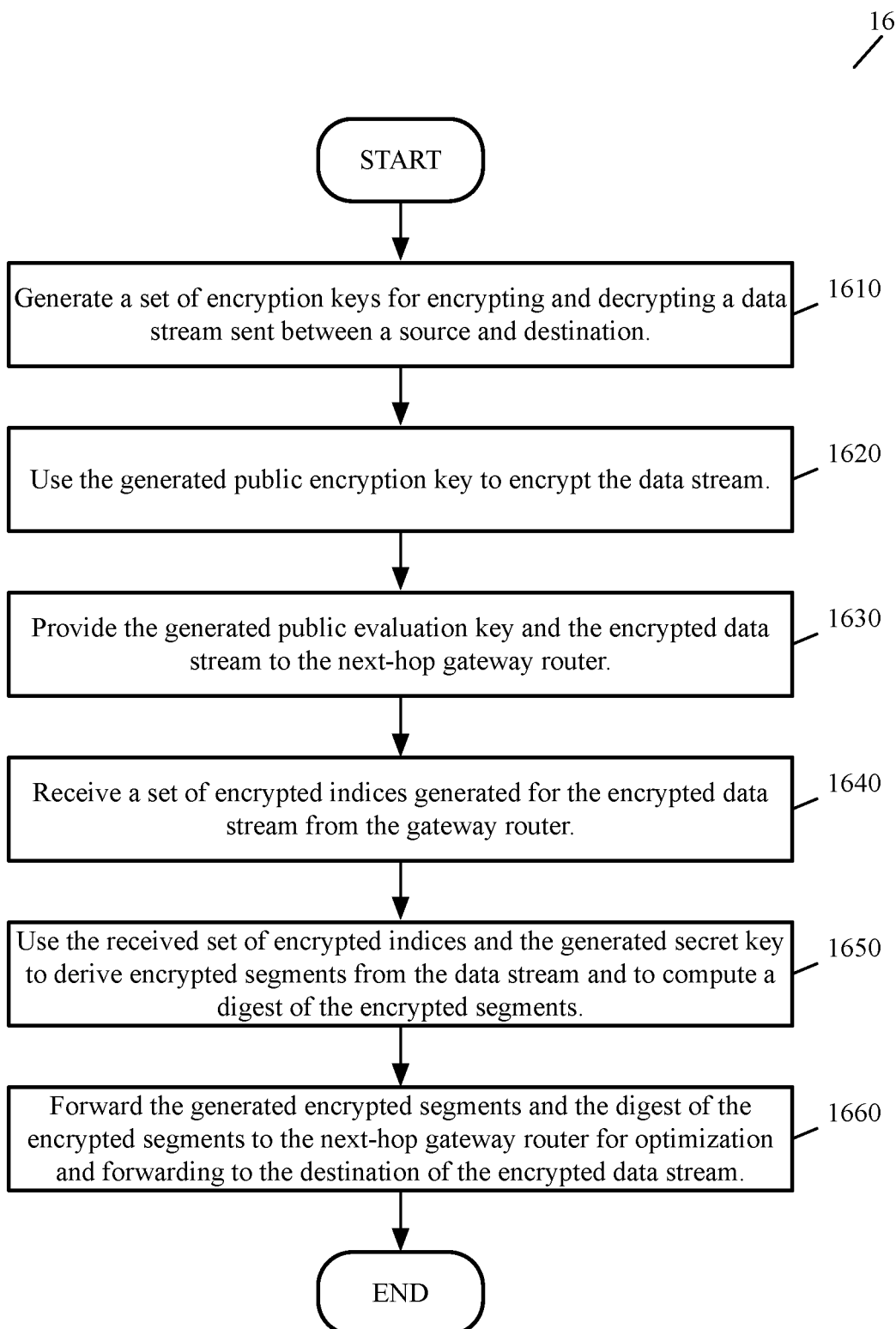
FIG. 16 conceptually illustrates a process performed by a sender in some embodiments when sending an encrypted data stream.

As will be described below, FIGS. 15-18 illustrate a first example of some embodiments that use a fully homomorphic encryption (FHE) scheme. FIG. 15 conceptually illustrates a workflow between a sender, a gateway equipped with a WAN optimizer, and a receiver in some embodiments when sending an encrypted data stream from the sender to the receiver using a first FHE scheme. FIG. 15 will be described by reference to FIGS. 16-18. FIG. 16 conceptually illustrates a process performed by a sender in some embodiments when sending an encrypted data stream.

It should be noted that in the embodiments described below, the sender and receiver share a symmetric key k←SYM.Gen($1^\kappa$), that is not shared with the gateway. This symmetric key, k, is not shared with the gateway. To generate the symmetric key, the algorithm Gen is given the security parameter κ and outputs a key k. An encryption algorithm Enc, used by the sender, is then given a key k and a plaintext pt (i.e., plaintext data) and outputs a ciphertext ct (i.e., an encrypted version of the file or data stream). Lastly, a decryption algorithm Dec, used by the receiver, is given the key k and ciphertext ct and outputs the plaintext pt.

The process 1600 starts when the sender generates (at 1610) a tuple of keys for encrypting, evaluating, and decrypting a data stream sent between a source and destination. For instance, in FIG. 15, the sender 1510 at the encircled 1 is illustrated as generating a tuple of keys (pk, sk, ek). This generated tuple of keys is different from the symmetric key described above that is shared by the sender and receiver. The tuple of keys (pk, sk, ek) includes a public encryption key pk, a secret decryption key sk, and a public evaluation key ek. The sender generates these keys using an algorithm Gen, which when given the security parameter κ, outputs the set of keys pk, sk, and ek (i.e., (pk, sk, ek)←FHE.Gen($1^\kappa$)).

The properties of a secure homomorphic encryption include correctness, security, and utility. With regard to correctness, it holds that FHE.Dec(sk, FHE.Enc(pk, pt))=pt, where (pk, sk, ek)←FHE.Gen($1^\kappa$). The security follows a typical chosen-plaintext attack (CPA) security definition of an encryption scheme. Lastly, with regard to utility, for every (pk,sk,ek)←FHE.Gen($1^\kappa$) and every m-ary function $f$, let $ct_1, \ldots, ct_m$ be m ciphertexts and $pt_1, \ldots, pt_m$ be their corresponding plaintexts. That is, $pt_i$=FHE.Dec(sk, $ct_i$) for every i∈[m]. It holds that $f(pt_1, \ldots, pt_m)$=FHE.Dec(sk, FHE.Eval(ek, $f$, $ct_1, \ldots, ct_m$)).

The process 1600 uses (at 1620) the generated public encryption key (pk) to encrypt the data stream. That is, the sender S has the file F∈$\{0, 1\}^*$ and computes $\hat{F}$←FHE.Enc(pk, F'). The encrypted data steam (also referred to herein as a ciphertext) can later be decrypted at the receiver using the generated secret decryption key (sk) as will be described further below.

The process 1600 provides (at 1630) the generated public evaluation key (ek) and the encrypted data stream ($\hat{F}$) to the next-hop gateway router. In some embodiments, the sender provides the public evaluation key (ek) to the gateway router after it has been generated and before computing the encrypted data stream. For instance, the sender 1510 is shown providing the key ek to the gateway 1520 at the encircled 1, and subsequently computing the encrypted data stream and providing the encrypted data stream to the gateway 1520 at the encircled 2. By providing the public evaluation key ek to the gateway 1520, the sender 1510 enables the gateway to generate the set of encrypted indices without having to decrypt the encrypted data stream, as well as perform other operations on the encrypted data stream as will be described further below.

The process 1600 receives (at 1640) a set of encrypted indices ($\hat{i}_0, \ldots, \hat{i}_k$) generated for the encrypted data stream from the gateway router. The gateway 1520, for instance, provides encrypted indices to the sender 1510 at the encircled 2. As described above for FIGS. 2 and 3, the gateway routers are equipped with WAN optimizers that include an index generator 310/410 for generating the encrypted indices for the encrypted data streams, in some embodiments. The generated encrypted indices are then provided to a segmenter, which in some embodiments, such as for the WAN optimizer 305, is located at the gateway, while in other embodiments, such as in the diagram 400, the segmenter 420 is located at the sender 465.

The process 1600 uses (at 1650) the received set of encrypted indices and the generated secret key to derive encrypted segments from the data stream and to compute a digest of the encrypted segments. That is, the sender computes $i_j$←FHE.Dec(sk,$\hat{i}_j$) for all j∈[0,k] and, from these indices, derives the chunks ($c_0, \ldots, c_{k-1}$) (i.e., the segments) and computes the digests $d_j$=digest($c_j$) for all j∈[0,k-1]. Each digest is a special kind of hash that acts as a fingerprint for the data, in some embodiments, and if the segment digest is encrypted with a private key, this can be used as a digital signature to ensure it came from a particular source in some such embodiments.

The process 1600 forwards (at 1660) the generated encrypted segments and the digest of the encrypted segments to the next-hop gateway router for optimization and forwarding to the destination of the encrypted data stream. More specifically, the sender computes $\hat{c}_j$←SYM.Enc(k,$c_j$) for all j∈[0,k-1] and sends ($\hat{c}_0,d_0$), ..., ($\hat{c}_{k-1},d_{k-1}$) to the gateway. For instance, the sender 1510, at the encircled 3, uses the indices to derive segments and compute digests, and then sends the encrypted segments and digests to the gateway 1520 for further optimization and forwarding to the receiver 1530. Following 1660, the process 1600 ends.

Figure 17:
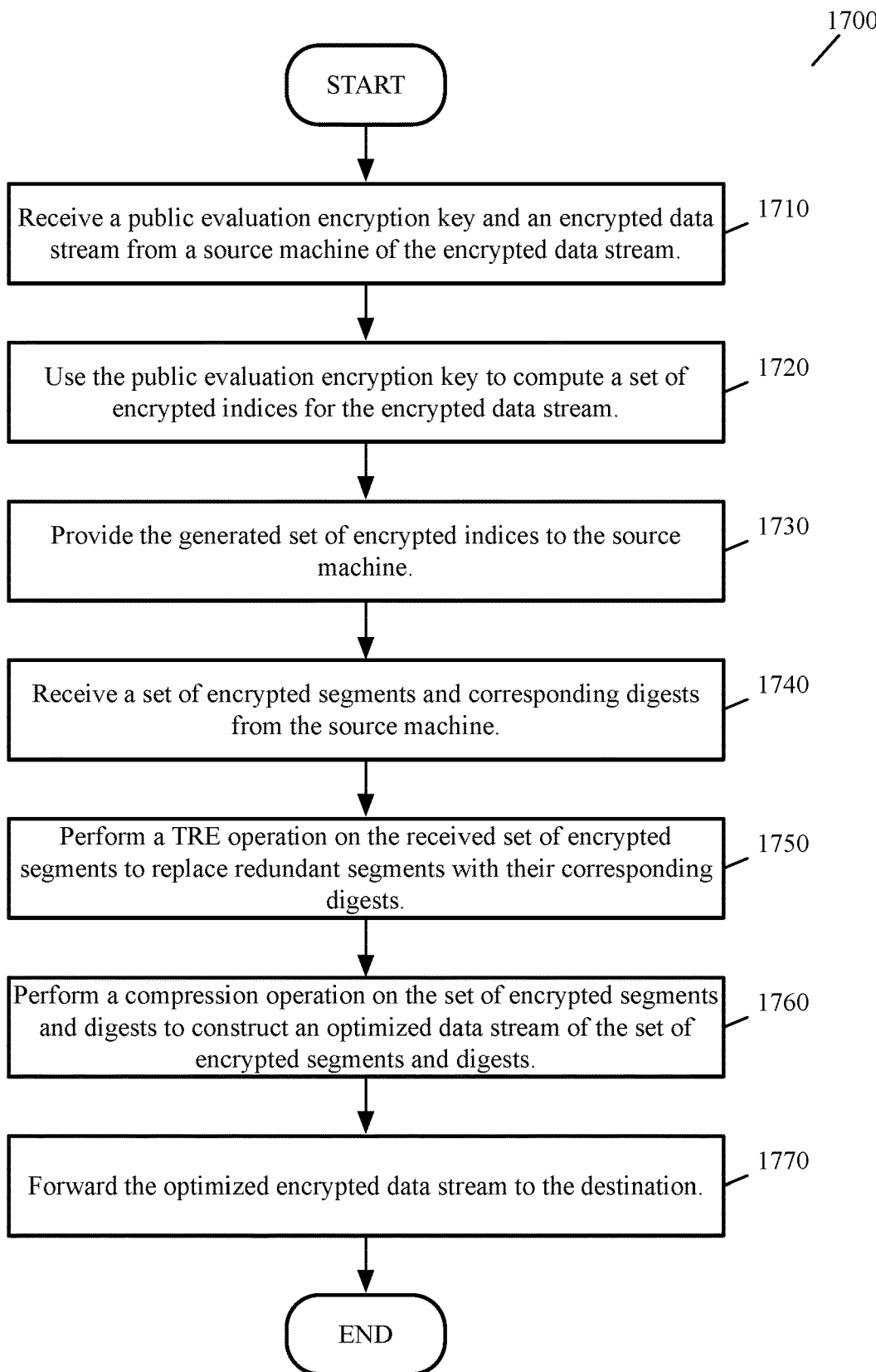
FIG. 17 conceptually illustrates a process performed in some embodiments by a gateway router that is deployed to a public cloud and equipped with a WAN optimizer for optimizing encrypted data streams sent from at least one sender to at least one receiver.

FIG. 17 conceptually illustrates a process performed in some embodiments by a gateway router that is deployed to a public cloud and equipped with a WAN optimizer for optimizing encrypted data streams sent from at least one sender to at least one receiver. The process 1700 starts when the gateway router receives (at 1710) a public evaluation key and an encrypted data stream from a source machine of the encrypted data stream. In some embodiments, the gateway router receives the public evaluation key separately from, and prior to receiving the encrypted data stream. For instance, in some embodiments, the sender computes the set of keys and provides the public evaluation key to the gateway router before encrypting the data stream (i.e., computing the ciphertext) that is eventually provided to the gateway router. At the encircled 1 in FIG. 15, for instance, the gateway 1520 receives the key ek from the sender 1510, and subsequently receives the encrypted data stream at the encircled 2.

The process 1700 uses (at 1720) the public evaluation key to compute a set of encrypted indices for the encrypted data stream. The gateway 1520, for example, is illustrated as computing the encrypted indices after receiving the encrypted data stream and key ek from the sender 1510. To generate the indices, the gateway uses the Eval algorithm and computes $(\hat{i}_0, \ldots, \hat{i}_k) \leftarrow$ FHE.Eval(ek, chunk, $\hat{F}$), where $(\hat{i}_0, \ldots, \hat{i}_k)$ represents the computed indices. In other words, given an input string of arbitrary length, Eval algorithm used by the gateway returns a monotonically increasing list of indices such that the index $i_0 = 0$ and $i_k = |s|$.

The process 1700 provides (at 1730) the generated set of encrypted indices to the source machine. Because the source machine (i.e., sender) is responsible in this FHE scheme for segmenting the data stream and generating the digests, as described above with reference to the process 1600, the gateway router must return the indices to the source machine to enable the source machine to perform the computations to derive the segments (i.e., chunks) and compute the corresponding digests.

Accordingly, the process 1700 receives (at 1740) a set of encrypted segments and corresponding digests from the source machine. More specifically, from the source machine, the gateway router receives $(\hat{c}_0, d_0), \ldots, (\hat{c}_{k-1}, d_{k-1})$, representing the chunks and corresponding digests. At the encircled 3 in FIG. 15, for example, the gateway 1520 receives the encrypted segments and digests from the sender 1520, which the sender computed using the indices generated and provided by the gateway 1520.

The process 1700 performs (at 1750) a TRE operation on the received set of encrypted segments to replace redundant segments with their corresponding digests and performs (at 1760) a compression operation on the set of encrypted segments and digests to construct an optimized data stream of the set of encrypted segments and digests. The TRE operation and compression operation are the WAN optimizations that the gateway router performs on encrypted data streams (without decrypting these encrypted data streams) before forwarding to the receivers (i.e., destinations) of these encrypted data streams.

In some embodiments, the sender has already performed the TRE operation on the encrypted segments and replaced redundant segments with their corresponding digests before providing the encrypted segments and digests to the gateway, and the WAN optimization performed by the gateway includes compressing the encrypted segments and digests to produce the optimized encrypted data stream. The gateway router uses the encrypted segments and digests to construct the optimized encrypted data stream (i.e., file) $F' = (m_0, \ldots, m_{k-1})$ where $m_i = \hat{c}_i$ if $d_i \notin st_S$ and $m_i = d_i$ otherwise.

The process 1700 forwards (at 1770) the optimized encrypted data stream to the destination. In some embodiments, in addition to forwarding the optimized encrypted file F', where $F' = (m_0, \ldots, m_{k-1})$, the gateway router also updates $st_S = \text{cache}(st_S, F')$ to reflect that these chunks have been sent, and thus prevent the gateway router from sending redundant chunks in future data streams, according to some embodiments. For example, a subsequent data stream may include a chunk that is now stored in the segment cache after the initial data stream has been sent, and thus, the gateway would only need to send the digest for the segment rather than the full segment to the receiver based on the full segment having been added to the segment cache, and without requiring any updates from the receiver (i.e., updates regarding what it has stored in its segment cache). Following 1770, the process 1700 ends.

Figure 18:
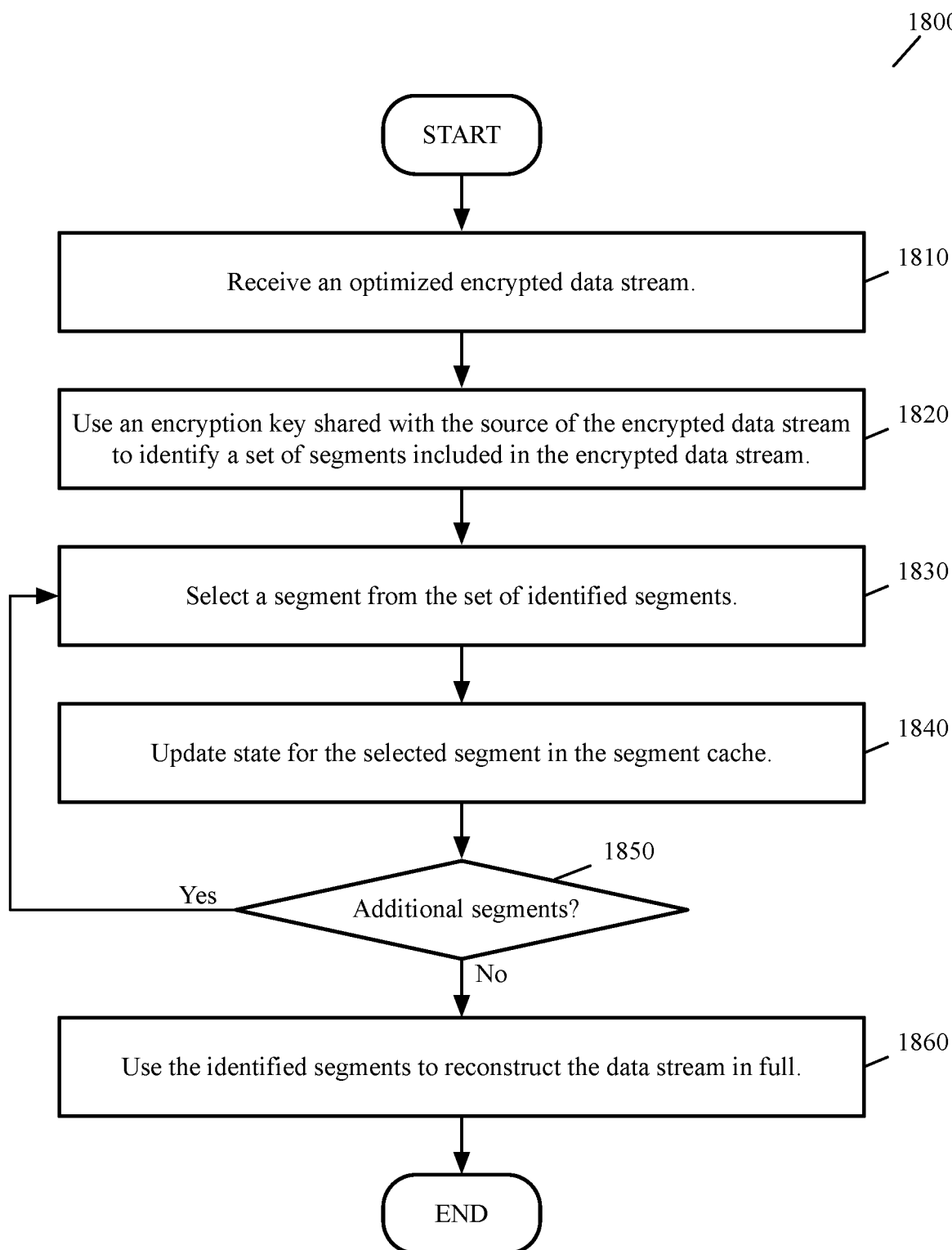
FIG. 18 conceptually illustrates a process performed in some embodiments by a receiver of an optimized, encrypted data stream.

FIG. 18 conceptually illustrates a process performed in some embodiments by a receiver of an optimized, encrypted data stream. The receiver, in some embodiments, is a receiver-side gateway router deployed to a public cloud to process optimized, encrypted data streams sent between a particular source and the receiver. In other embodiments, the receiver is a destination device of the data stream. The process 1800 starts when the receiver receives (at 1810) an optimized encrypted data stream. As described in the processes 1600 and 1700 above, the optimized encrypted data stream F' in this FHE scheme is equal to $(m_0, \ldots, m_{k-1})$, wherein where $m_i = \hat{c}_i$ if $d_i \notin st_S$ and $m_i = d_i$ otherwise. The optimized encrypted data stream is received from a sender-side gateway router deployed to a public cloud to perform WAN optimization and forwarding operations for data streams sent between the sender and receiver. The receiver 1530, for example, is illustrated in FIG. 15 at the encircled 3 as receiving an optimized encrypted data stream from the gateway 1520.

The process 1800 uses (at 1820) an encryption key shared with the source of the encrypted data stream to identify a set of segments included in the encrypted data stream. As described above, the encryption key shared between the source and destination (i.e., sender and receiver) is a symmetric encryption key k computed by the sender (k← SYM.Gen($1^\kappa$)), in some embodiments. This symmetric key is not shared with the gateway that optimizes the encrypted data stream. To identify the set of segments, the receiver computes $m_i = $SYM.Dec$(k, m_i)$ for all $i \in [0, k-1]$ such that type $(m_i)$=chunk.

The process 1800 selects (at 1830) a segment from the set of identified segments and updates (at 1840) state for the selected segment in the segment cache. For instance, for each segment, the receiver updates $st_R = \text{cache}(st_R, F')$. As describe above, each state is a data structure of type dictionary that maps digests to their corresponding segments such that the states are a list of links from digest 1 to segment 1 up through digest m through segment m, with each of the digests being of length n and the segments being of any length. In some embodiments, each state has a corresponding counter that is also updated with a timestamp to reflect the most recent receipt of the corresponding segment and/or digest.

The process 1800 determines (at 1850) whether there are additional segments for selection. In other words, the process determines whether the last chunk in the stream has been processed. When the process determines that there are additional segments for selection, the process returns to step 1830 to select a segment from the set of identified segments. Otherwise, when the process determines that there are no additional segments for selection, the process 1800 transitions to use (at 1860) the identified segments to reconstruct the data stream in full. The receiver reconstructs the file $F = (c_0, \ldots, c_{k-1})$ with $\hat{c}_i = st_R[m_i]$ if $m_i \in st_R$, and $c_i = m_i m_i \notin st_R$. Following 1860, the process 1800 ends.

As mentioned above, the information revealed to the gateway consists of the number of indices, the size of the chunks, the digests and how many times the digests repeat. To justify this effort, suppose that the file to transfer contains a DNA data. Each gene has its own pattern, for instance, gene $g_1$'s contains a sequence of 5 nucleotides that repeats itself in positions 1,290,1123 in the file, and gene $g_2$ contains a sequence of 5 nucleotides that repeats itself in positions 5, 30, 60, 110. The gateway, which knows that the file contains a DNA sequence, can compute the digests of all possible 5-nucleotides sequences, and compare them to the digests received from the sender, in order to determine which DNA sequence was sent (and hence, other sensitive information). Furthermore, even if these sequences were of 100 nucleotides, in which case computing the digest of all possible 100-nucleotides sequences was not feasible, the gateway could distinguish between $g_1$ and $g_2$ by simply looking at the list of digests and counting how many times the same sequence is sent (i.e., how many times the digest of the repeating sequence repeats itself).

Figure 19:
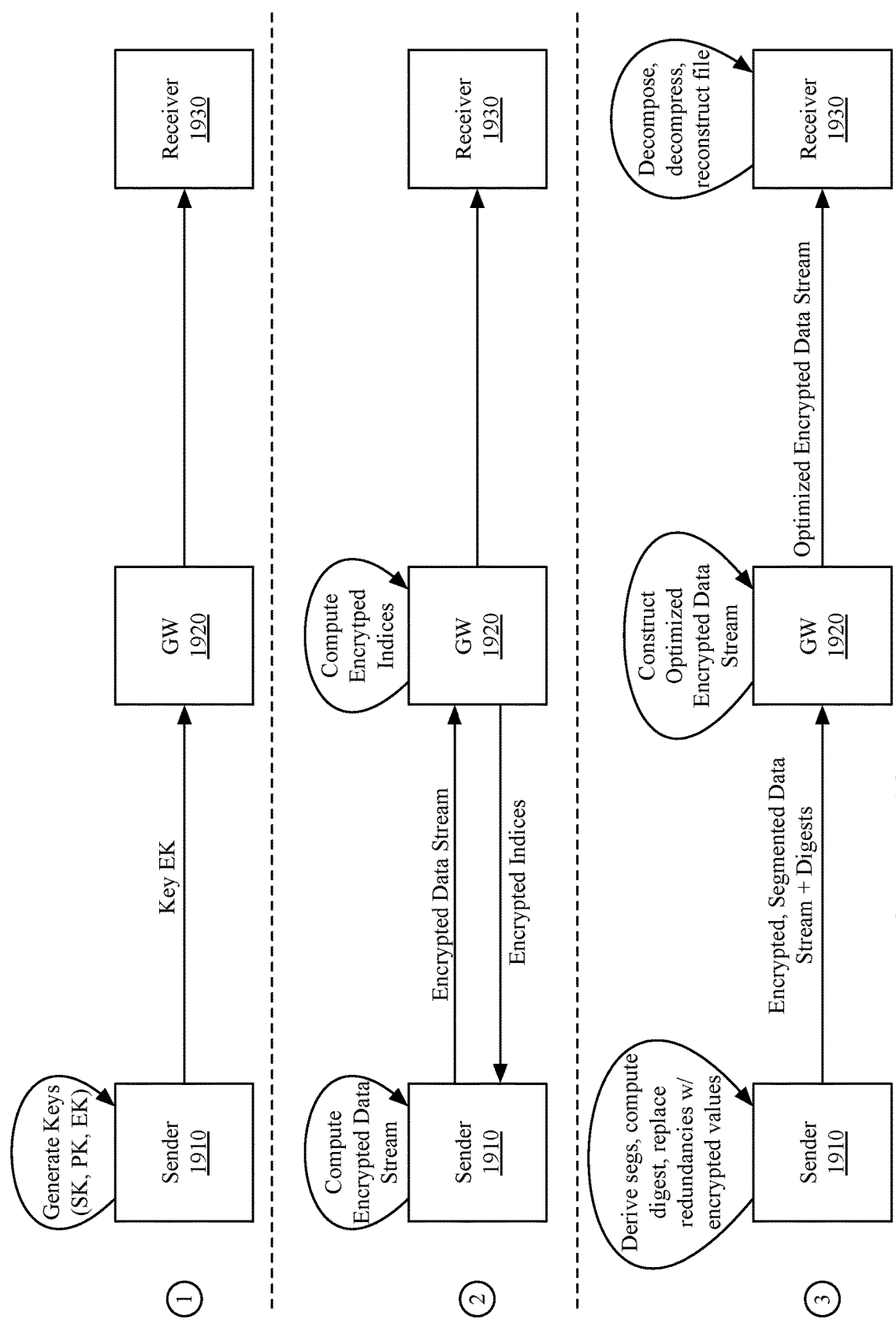
FIG. 19 conceptually illustrates a workflow between a sender, a gateway equipped with a WAN optimizer, and a receiver in some embodiments when sending an encrypted data stream from the sender to the receiver using a second FHE scheme.
Figure 20:
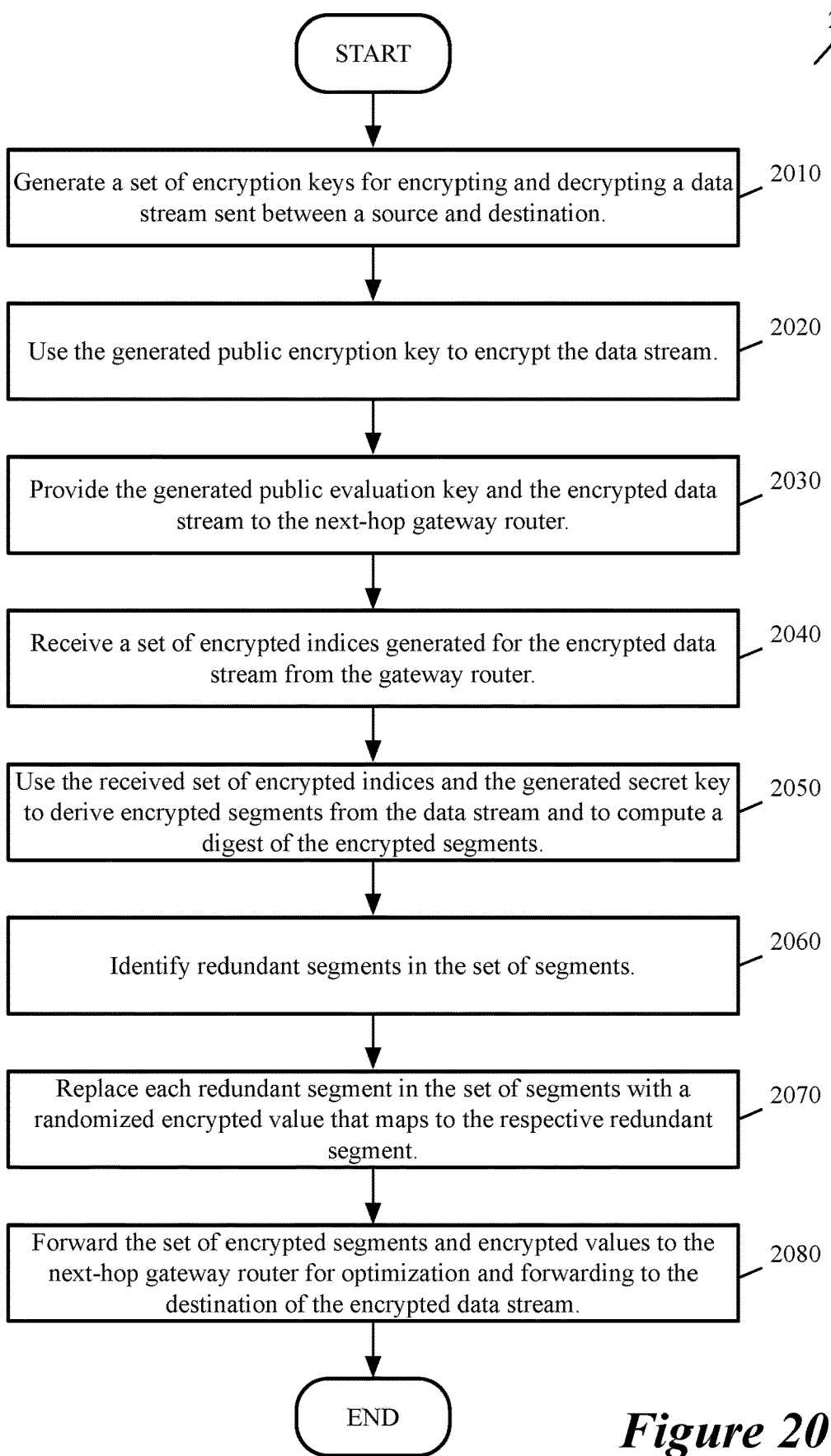
FIG. 20 conceptually illustrates a process performed by a source of an encrypted data stream using a second FHE scheme, in some embodiments.
Figure 21:
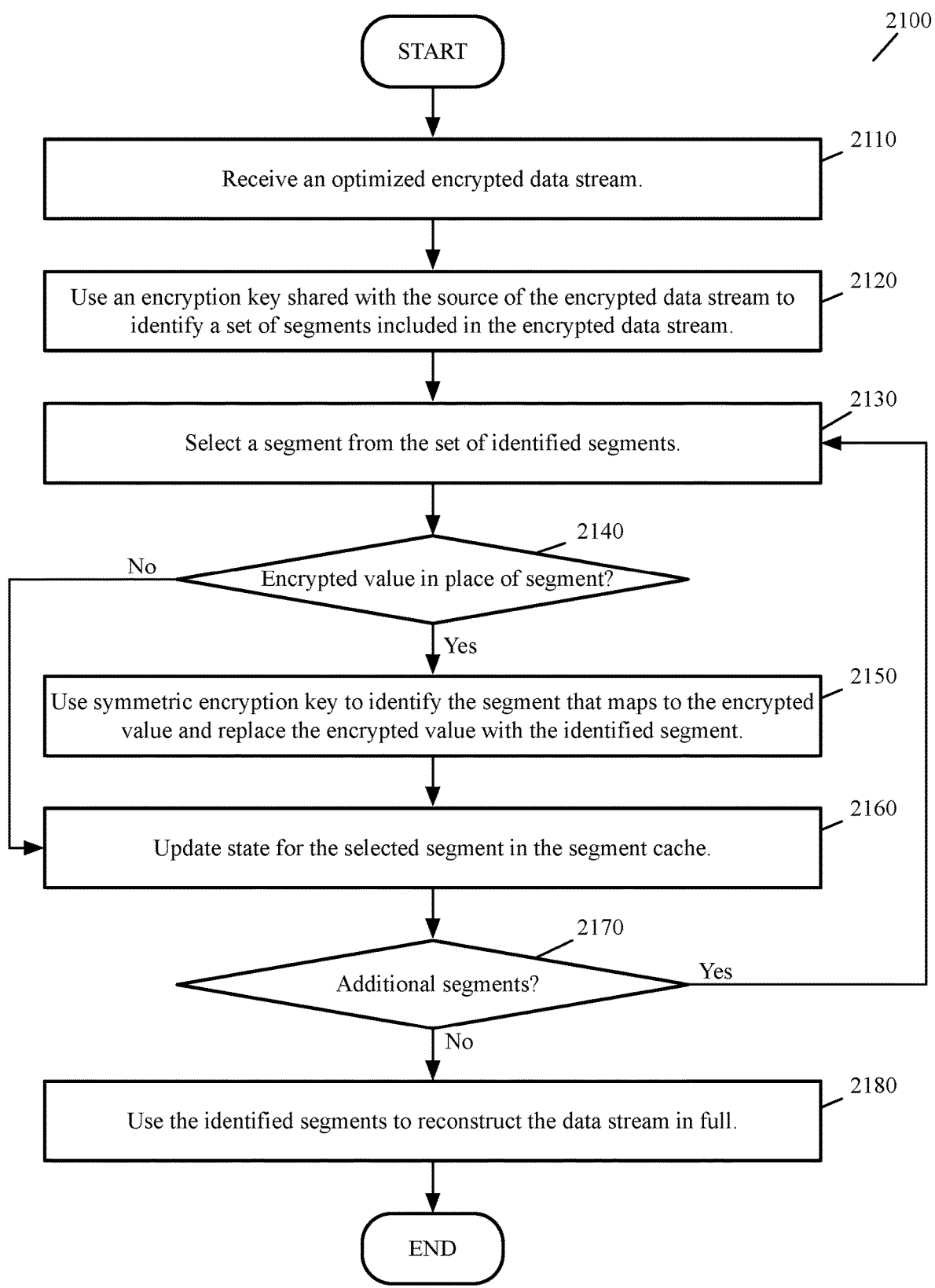
FIG. 21 conceptually illustrates a process performed in some embodiments by a receiver of an optimized encrypted data stream sent from a particular source and optimized by a gateway router deployed to a public cloud and equipped with a WAN optimizer.

In order to reduce this leakage, some embodiments inject a long random seed, which is shared only between the sender and receiver, to the digest algorithm. As a result of injecting this long random seed, only the sender and receiver would be able to run the digest algorithm on their own (i.e., the gateway router with WAN optimizer would not be able to run the digest algorithm). In addition to the long random seed, some such embodiments also eliminate repetitions of digests by encrypting the long random seeds that have been injected. In some embodiments, this network optimization can be done already at the sender itself before the encrypted data stream arrives at the gateway. FIGS. 19-21 illustrate embodiments in which these leakage reduction methods are performed. Like the embodiments described above, the sender and receiver in the embodiments described below share a symmetric key k←SYM.Gen($1^\kappa$), that is not shared with the gateway. In addition to this shared symmetric key k, the sender and receiver in the embodiments described below also share a random seed s∈$\{0, 1\}^\kappa$, which will be used in the digest algorithm.

FIG. 19 conceptually illustrates a workflow between a sender, a gateway equipped with a WAN optimizer, and a receiver in some embodiments when sending an encrypted data stream from the sender to the receiver using a second FHE scheme. FIG. 19 will be described below by references to FIGS. 20-21. FIG. 20 conceptually illustrates a process performed by a source of an encrypted data stream using a second FHE scheme, in some embodiments. The process 2000 starts when the source generates (at 2010) a tuple of keys for encrypting, evaluating, and decrypting a data stream sent between a source and destination. The sender generates these keys using an algorithm Gen, which when given the security parameter κ, outputs the set of keys pk, sk, and ek (i.e., (pk, sk, ek)←FHE.Gen($1^\kappa$)). As illustrated by FIG. 19, the sender 1910 generates the tuple of keys at the encircled 1.

The process 2000 uses (at 2020) the generated public encryption key to encrypt the data stream. The sender S has the file F∈$\{0, 1\}$* and computes F̂←FHE.Enc(pk, F). This step 2020 mirrors the step 1620 described above for the first example FHE scheme. The encrypted data stream, in some embodiments, is also referred to as a ciphertext.

The process 2000 provides (at 2030) the generated public evaluation key and the encrypted data stream to the next-hop gateway router. That is, the sender provides the generated public evaluation key ek and the encrypted data stream F̂ to the gateway router for use by the gateway router to compute the indices. In some embodiments, steps 2020 and 2030 are performed in reverse, with the public evaluation key being provided to the gateway before the ciphertext of the data stream has been computed. For instance, the sender 1910 is illustrated as providing the key ek to the gateway 1920 at the encircled 1, and subsequently computing the encrypted data stream and providing the encrypted data stream to the gateway 1920 at the encircled 2.

The process 2000 receives (at 2040) a set of encrypted indices ($\hat{\imath}_0, \ldots, \hat{\imath}_k$) generated for the encrypted data stream from the gateway router. After receiving the public evaluation key and the ciphertext, the gateway computes the encrypted indices and sends them back to the sender, which performs the segmenting operation on the encrypted data stream, according to some embodiments.

The process 2000 uses (at 2050) the received set of encrypted indices and the generated secret key to derive encrypted segments from the data stream and to compute a digest of the encrypted segments. The sender uses the indices and computes $i_j$←FHE.Dec(sk,$\hat{\imath}_j$) for all j∈[0,k]. From these indices, the sender derives the chunks ($c_0, \ldots, c_{k-1}$) and computes the digests $d_j$=digest(s∥$c_j$) for all j∈[0, k−1].

The process 2000 identifies (at 2060) redundant segments in the set of segments and replaces (at 2070) each redundant segment in the set of segments with an encrypted value that maps to the respective redundant segment. In some embodiments, each encrypted value is generated using a probabilistic encryption function. To identify redundant segments and replace these identified redundant segments with the encrypted values, the sender first computes $\hat{c}_j$←SYM.Enc(k,$c_j$) for all j∈[0,k−1]. Let ($\hat{c}_0, d_0), \ldots, (\hat{c}_{k-1}, d_{k-1}$) be the result of this computation. For every j∈[0, k−1], if ($\hat{c}_j, d_j$) already appears earlier in the list, suppose its first occurrence is at position $j_0$, then the sender computes $q_j$=SYM.Enc(k, $j_0$) and replaces ($\hat{c}_j, d_j$), with $q_j$.

In other words, rather than forwarding the encrypted data stream to the gateway, the sender performs the TRE operation on the encrypted data stream itself. For example, the sender 1910 is illustrated as deriving segments, computing digests, and replacing redundancies with encrypted values at the encircled 3. Performing this operation at the sender, and replacing the redundancies with encrypted values rather than the digests provides for better security when the gateway subsequently performs its series of processing and WAN optimization on the encrypted data stream.

The process 2000 forwards (at 2080) the set of encrypted segments and encrypted values to the next-hop gateway router for optimization and forwarding to the destination of the encrypted data stream. That is, the sender sends the list resulting from the computations in step 2070 to the gateway router for optimization and forwarding. The gateway router then constructs the optimized file F'=($m_0, \ldots, m_{k-1}$) where $m_i$=$\hat{c}_i$ if $d_i$∉$st_S$ and $m_i$=$d_i$ otherwise, sends it to the receiver, and updates $st_S$=cache($st_S$, F'). The cache algorithm is instructed to ignore the positions in which there is an encryption q. As illustrated by FIG. 19, the operations performed by the gateway 1920 are essentially identical to those performed by the gateway 1520. Following 2080, the process 2000 ends.

FIG. 21 conceptually illustrates a process performed in some embodiments by a receiver of an optimized encrypted data stream sent from a particular source and optimized by a gateway router deployed to a public cloud and equipped with a WAN optimizer. The process 2100 starts when the gateway router receives (at 2110) an optimized encrypted data stream. The optimized encrypted data stream is the optimized encrypted file, F', which is equal to ($m_0, \ldots, m_{k-1}$) as mentioned above.

The process 2100 uses (at 2120) an encryption key shared with the source of the encrypted data stream to identify a set of segments (i.e., chunks) included in the encrypted data stream. That is, the receiver computes $m_i$=SYM.Dec(k, $m_i$) for all i∈[0, k−1] such that type ($m_i$)=chunk, where k is the symmetric encryption key shared between the sender and receiver.

The process 2100 selects (at 2130) a segment from the set of identified segments and determines (at 2140) whether there is an encrypted value in place of the selected segment. As described by step 2060 in the process 2000, the sender replaces each redundant segment with an encrypted value by first computing $\hat{c}_j \leftarrow$ SYM.Enc(k,$c_j$) for all $j \in [0,k-1]$, and where $(\hat{c}_0, d_0), \ldots, (\hat{c}_{k-1}, d_{k-1})$ is the result of this computation, for every $j \in [0, k-1]$, if $(\hat{c}_j, d_j)$ already appears earlier in the list, suppose its first occurrence is at position $j_0$, then the sender computes $q_j$=SYM.Enc(k, $j_0$) and replaces $(\hat{c}_j, d_j)$ with $q_j$. As such, when the process determines that there is not an encrypted value in place of the segment, the process 2100 transitions to 2160 to update state for the selected segment.

Otherwise, when the process 2100 determines that there is an encrypted value in place of the selected segment, the process 2100 transitions to use (at 2150) the symmetric encryption key k shared with the sender to identify the segment that maps to the encrypted value and replace the encrypted value with the identified segment. To do so, for every position $j \in [0\ k-1]$ in which there is an encryption, $m_j$=q, of an index, the receiver computes $j_0$=SYM.Dec(k, q) and replaces $m_j$ with the whatever appears in $m_{j_0}$ (i.e., either a chunk or a digest). For instance, the receiver 1930 is illustrated as decomposing, decompressing, and reconstructing the file after receiving the optimized data stream from the gateway 1920.

The process 2100 updates (at 2160) state for the selected segment in the segment cache. In some embodiments, the receiver updates the state (i.e., $st_R$=cache($st_R$, F')) for each segment upon computing the set of segments during step 2120 above rather than following steps 2140 and/or 2150. Each state is a mapping between a segment and its corresponding digest, according to some embodiments, and, in some embodiments, also includes a timestamp reflecting the most recent receipt of the corresponding segment and/or digest. As mentioned above, in some embodiments, the cache algorithm is instructed to ignore the positions in which there is an encryption q.

The process 2100 next determines (at 2170) whether there are additional segments to select. When there are additional segments for selection, the process 2100 returns to step 2130 to select a segment from the set of identified segments. Otherwise, when there are no additional segments for selection, the process transitions to use (at 2180) the identified segments to reconstruct the data stream in full. The receiver reconstructs the file F=($c_0, \ldots, c_{k-1}$) with $c_i$=$st_R[m_i]$ if $m_i \in st_R$, and $c_i$=$m_i,m_i \notin st_R$. Following 2180, the process 2100 ends.

In the above embodiments described by reference to FIGS. 19-21, the sender and the gateway have to interact before sending the optimized file to the receiver (i.e., to have the gateway generate the indices for use by the sender). In some such embodiments, these interactions can increase the latency. The embodiments that will be described below by references to FIGS. 22-26 provide a third FHE scheme that reduces these interactions by storing the state in an FHE-encrypted format such that even the cache algorithm could be evaluated on encrypted data. For these embodiments described below, the optimize algorithm is defined such that given a state st, a file F, a list of indices $i_0, \ldots, i_k$, the optimize algorithm computes F'=($c'_0, \ldots, c'_{k-1}$)$\leftarrow$derive(F, $i_0, \ldots, i_k$), and then, for every $j \in [0,k-1]$, the optimize algorithm replaces $c'_j$ with $d_j$=digest($c'_j$) if $c'_j \in$st. Finally, the algorithm computes st'$\leftarrow$cache(st,F'), and outputs (st',F').

Figure 22:
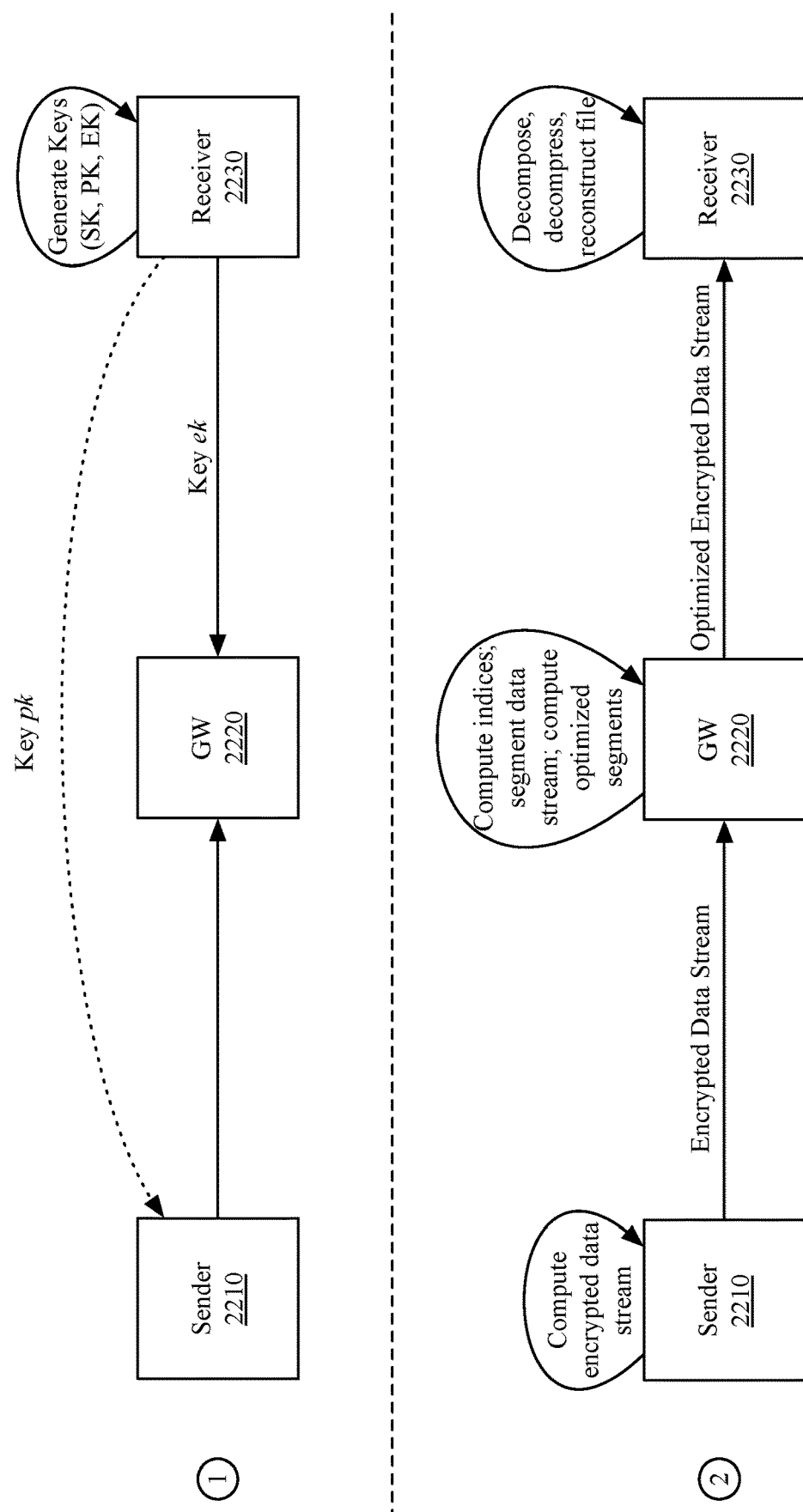
FIG. 22 conceptually illustrates a workflow between a sender, a gateway equipped with a WAN optimizer, and a receiver in some embodiments when sending an encrypted data stream from the sender to the receiver using the third FHE scheme.
Figure 23:
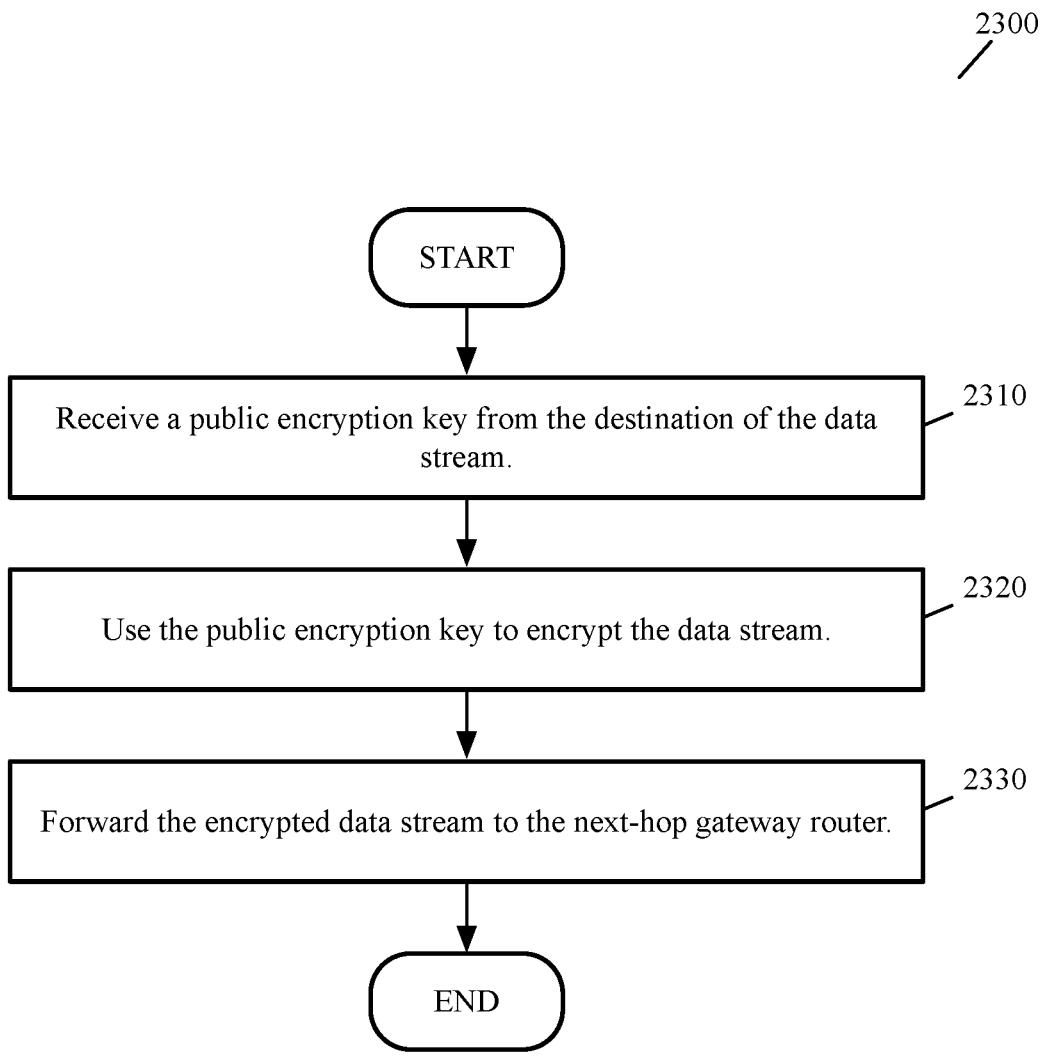
FIG. 23 conceptually illustrates a process performed in some embodiments by a source of an encrypted data stream using the third FHE scheme.

FIG. 22 conceptually illustrates a workflow between a sender, a gateway equipped with a WAN optimizer, and a receiver in some embodiments when sending an encrypted data stream from the sender to the receiver using the third FHE scheme. FIG. 22 will be described below by references to FIGS. 23-25. FIG. 23 conceptually illustrates a process performed in some embodiments by a source of an encrypted data stream using the third FHE scheme.

The process 2300 starts when the source receives (at 2310) a public encryption key from the destination of the data stream. Unlike the first and second FHE schemes described in the embodiments above, the third FHE scheme described herein by FIGS. 22-27 has the receiver generating the tuple of keys, as will be further described below. For example, the sender 2210 illustrated in FIG. 22 receives, at the encircled 1, a key pk from the receiver 2230, which is illustrated as generating the set of keys. In some embodiments, in addition to receiving the public encryption key from the receiver, the sender and receiver also initialize an empty state st, and send st$\leftarrow$FHE.Enc(pk, st) to the gateway.

The process 2300 uses (at 2320) the public encryption key to encrypt the data stream. Once the sender has the public encryption key pk from the receiver, the sender uses the public encryption key pk to encrypt the file F$\in\{0, 1\}^*$ by computing the ciphertext $\hat{F} \leftarrow$ FHE. Enc(pk, F). While the means of obtaining the public encryption key pk differ from the above embodiments, the operation for computing the ciphertext remains the same.

The process 2300 forwards (at 2330) the encrypted data stream to the next-hop gateway router. Because the third FHE scheme intends to reduce interactions between sender and gateway, the WAN optimization operations performed by the sender in some of the embodiments described above are moved instead to the gateway. For instance, rather than the implementation illustrated and described by FIG. 4, the third FHE scheme instead utilizes the WAN optimizer 305 illustrated and described by FIG. 3 which includes the index generator 310 for the segmenter, the segmenter 320, the TRE module 330, the compression module 340, and the QoS scheduling module 350. As such, after the sender forwards the encrypted data stream to the gateway at 2330, the process 2300 ends.

Figure 24:
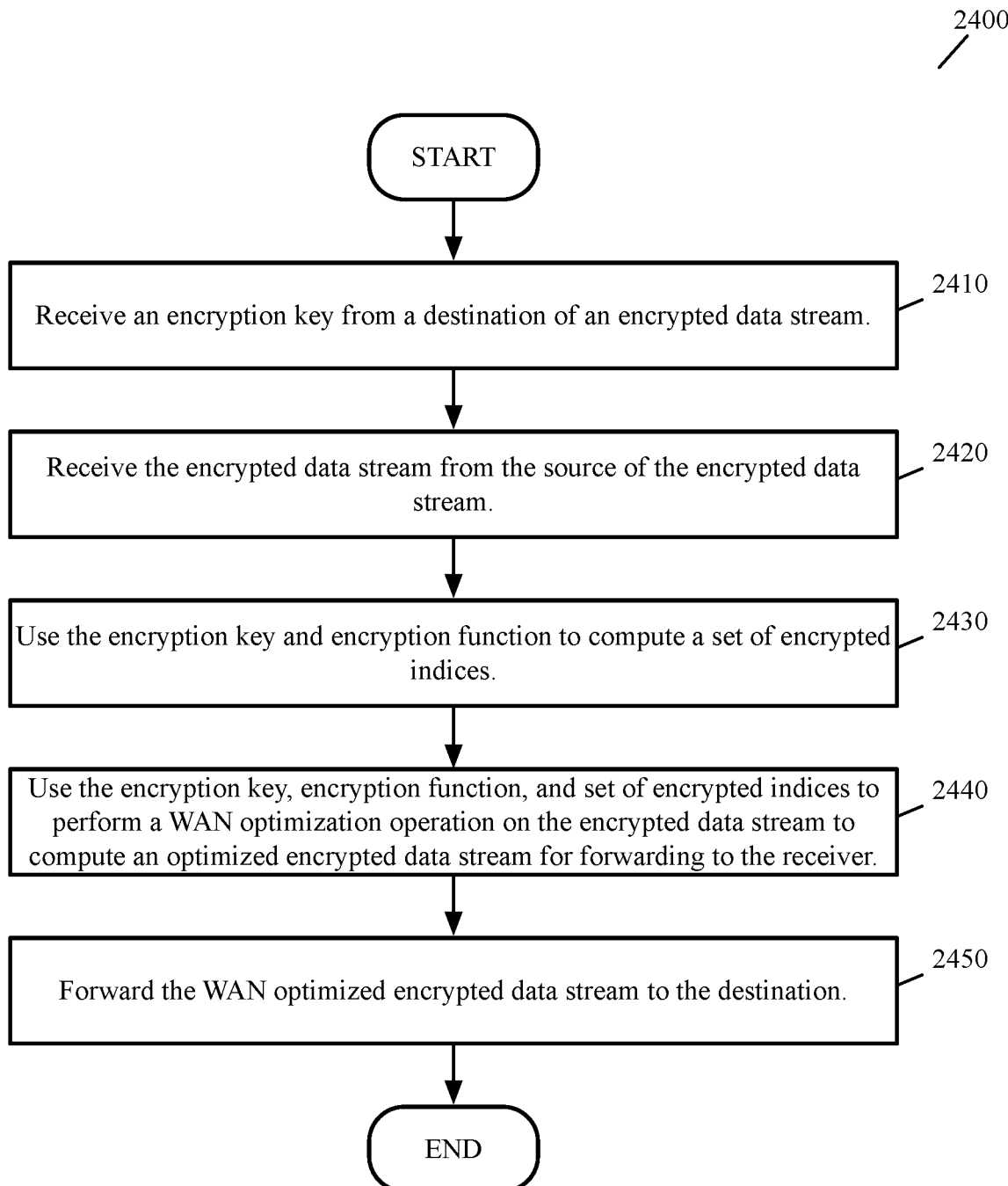
FIG. 24 conceptually illustrates a process performed in some embodiments by a source-side gateway router that optimizes encrypted data streams sent from a particular source to a particular destination using the third FHE scheme.

FIG. 24 conceptually illustrates a process performed in some embodiments by a source-side gateway router that optimizes encrypted data streams sent from a particular source to a particular destination using the third FHE scheme. The process 2400 starts when the source-side gateway router receives (at 2410) a public evaluation key from a destination of an encrypted data stream. Unlike the first and second FHE schemes, the gateway receives the key ek from the receiver rather than from the sender.

The process 2400 receives (at 2420) the encrypted data stream from the source of the encrypted data stream. In FIG. 22 for example, the sender 2210 is illustrated at the encircled 2 as computing the encrypted data stream and sending the encrypted data stream to the gateway 2220. The encrypted data stream is a ciphertext computed by $\hat{F} \leftarrow$ FHE.Enc(pk, F), where F represents the file or data stream, pk is the public encryption key generated by the receiver, and the resulting $\hat{F}$ is the ciphertext.

The process 2400 uses (at 2430) the public evaluation key and encryption function to compute a set of encrypted indices. That is, the gateway computes $(\hat{i}_0, \ldots, \hat{i}_k) \leftarrow$ FHE.Eval(ek, chunk, $\hat{F}$), where $(\hat{i}_0, \ldots, \hat{i}_k)$ are the indices. When the WAN optimizer 305 described above receives an encrypted data stream, for instance, the encrypted data stream is provided to the index generator 310 for generating the encrypted indices. Rather than send these encrypted indices back to the sender, the index generator 310 passes the generated encrypted indices and encrypted data stream to the segmenter 320. In some embodiments, one or more operations performed by one or more of the modules included in the WAN optimizer 305 are performed by a single module.

The process 2400 uses (at 2440) the public evaluation key, encryption function, and set of encrypted indices to perform a WAN optimization operation on the encrypted data stream to compute an optimized encrypted data stream for forwarding to the receiver. The WAN optimization operation, in some embodiments, includes deriving the chunks and digests, performing a TRE operation to replace duplicate segments with their digests, and performing a compression operation on the encrypted segments and digests. More specifically, the gateway computes $(\widehat{st'}, \hat{F}') \leftarrow \text{FHE.Eval}(ek, \text{optimize}, \widehat{st'}, \hat{F}, \hat{i}_0, \ldots, i_k)$. The gateway 2200, for instance, is illustrated at the encircled 2 as computing indices, segmenting the data stream, and computing the optimized segments.

The process 2400 forwards (at 2450) the WAN optimized encrypted data stream ($\hat{F}'$) to the destination. Once the gateway has produced the optimized encrypted data stream, the gateway forwards the optimized encrypted data stream to its destination through the WAN. For example, the gateway 2220 forwards the optimized encrypted data stream at the encircled 2 to the receiver 2230. Following 2450, the process 2400 ends.

Figure 25:
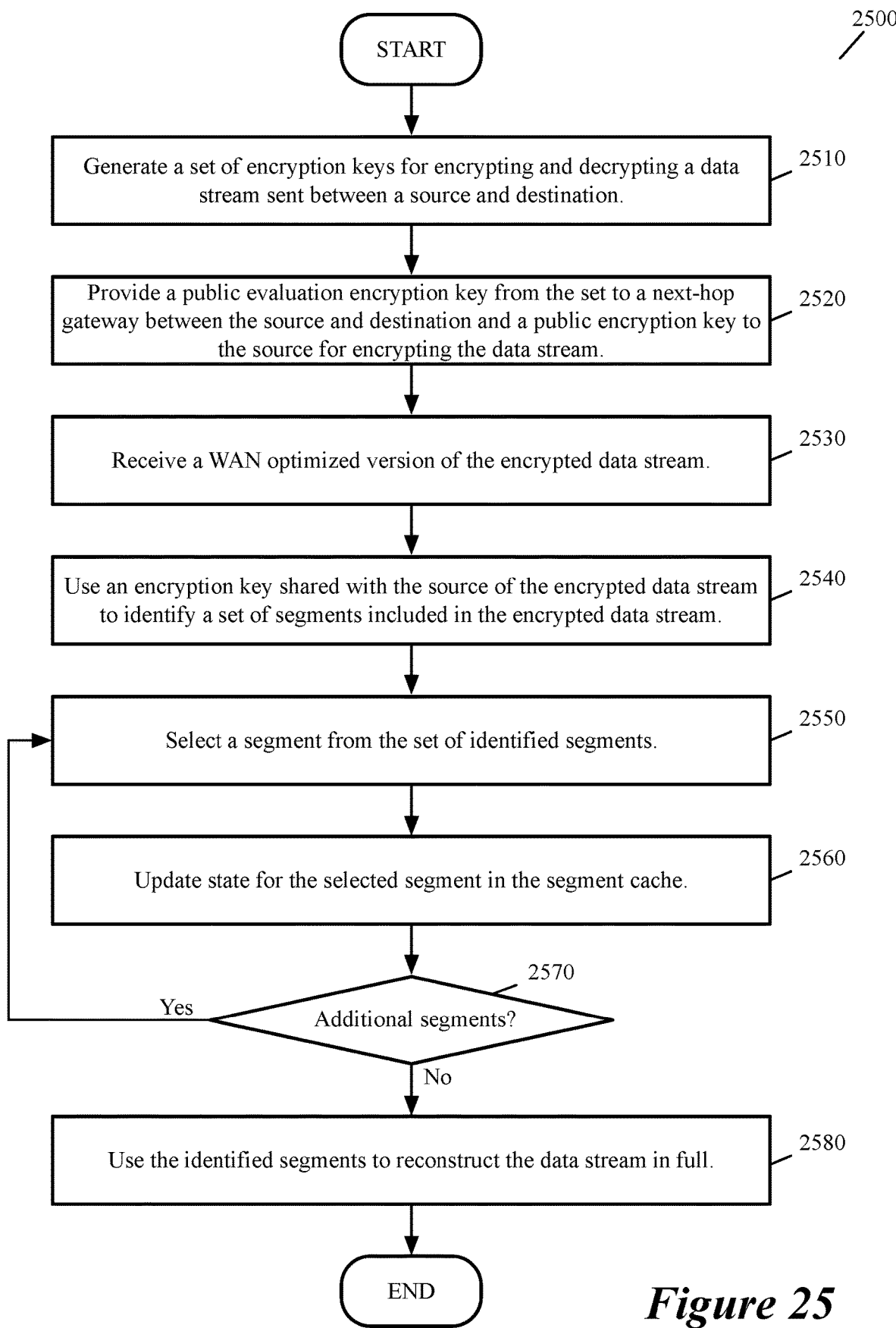
FIG. 25 conceptually illustrates a process performed in some embodiments by a receiver of an optimized encrypted data stream.
Figure 26:
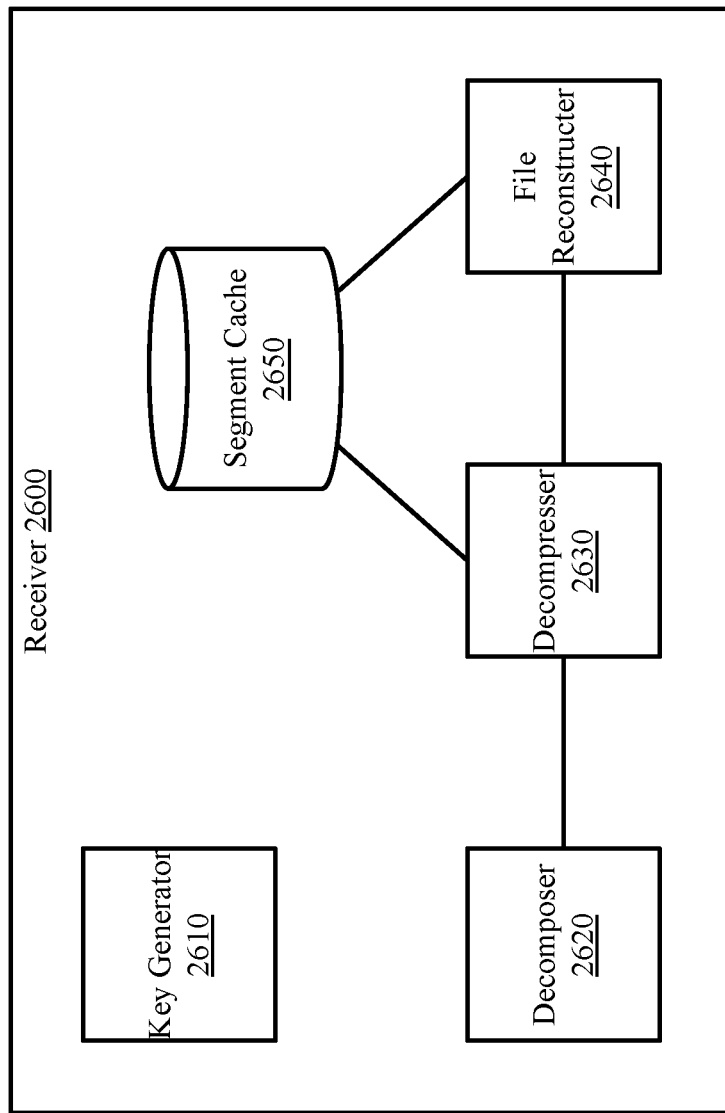
FIG. 26 conceptually illustrates a receiver of optimized encrypted data streams, in some embodiments.

FIG. 25 conceptually illustrates a process performed in some embodiments by a receiver of an optimized encrypted data stream. As in the embodiments above, the receiver performing the process 2500 in some embodiments is a receiver-side gateway router that processes optimized, encrypted data streams sent to a particular receiver, while in other embodiments, the receiver is simply the destination of the data stream. The process 2500 will be described below with references to FIG. 26, which conceptually illustrates a receiver in some embodiments.

The process 2500 starts when the receiver generates (at 2510) a tuple of keys for encrypting, evaluating, and decrypting a data stream sent between a source and destination. For instance, the receiver 2600 is illustrated as having a key generator 2610. Like the set of keys generated by the sender in embodiments described above, the tuple of keys generated by the receiver also includes a public encryption key pk, a secret decryption key sk, and a public evaluation key ek. The receiver generates these keys using the Gen algorithm, which when given the security parameter κ, outputs the set of keys pk, sk, and ek (i.e., (pk, sk, ek)←FHE.Gen($1^κ$)).

The process 2500 provides (at 2520) a public evaluation key from the set to a next-hop gateway between the source and destination and a public encryption key to the source for encrypting the data stream. In FIG. 22, for example, the receiver 2230 is illustrated as providing the key ek to the gateway 2220 and the key pk to the sender 2210. As mentioned above by reference to the process 2300, the sender and receiver of some embodiments also initialize an empty state st, and send st←FHE.Enc(pk, st) to the gateway.

The process 2500 receives (at 2530) a WAN optimized version of the encrypted data stream. The receiver 2230, for instance, receives the optimized encrypted data stream from the gateway 2220 at the encircled 2. The optimized encrypted data stream in some such embodiments does not include any encrypted values like those described for the second FHE scheme above as all of the WAN optimization operations are performed by the gateway rather than at the sender.

The process 2500 uses (at 2540) the secret decryption key generated during step 2510 to identify a set of segments included in the encrypted data stream. That is, from $\hat{F}'$, the receiver computes F'=FHE.Dec(sk, $\hat{F}'$) and denotes F'=($m_0, \ldots, m_{k-1}$). The receiver 2600, for instance, includes a decomposer 2620 for identifying the segments included in the encrypted data stream. Similar to the receiver-side gateway 905 described above, when an optimized encrypted data stream is received by the receiver 2600, the optimized encrypted data stream is passed to the decomposer 2620 for decomposition (i.e., identifying and separating out each segment), and then passes the decomposed segments to the decompressor 2630, which can add any new segments to the segment cache 2650.

The process 2500 selects (at 2550) a segment from the set of identified segments and updates (at 2560) state for the selected segment in the segment cache. More specifically, the receiver updates $st_R$=cache($st_R$, F'). In some embodiments, this is performed by the decompressor 2630 of the receiver 2600. As the decompressor 2630 adds new segments to the segment cache 2650, the decompressor 2630 also updates state for segments already stored in the cache 2650. In some embodiments, the updates include updating last-received timestamps for the segments to reflect the most recent receipt of these segments.

The process 2500 determines (at 2570) whether there are additional segments to be selected. When there are additional segments for selection (i.e., segments that have not yet been processed and either added to the cache or updated in the cache), the process returns to 2550 to select a segment. Otherwise, when there are no additional segments for selection, the process 2500 transitions to use (at 2580) the identified segments to reconstruct the data stream in full. The receiver reconstructs the file F=($c_0, \ldots, c_{k-1}$) with $c_i=st_R[m_i]$ if $m_i \in st_R$, and $c_i=m_i, m_i \notin st_R$. The receiver 2600, for instance, includes file reconstructer 2640 for reconstructing the files. The reconstructer 2640 has access to the segment cache 2650, and as such, can retrieve any full segments needed to replace segment identifiers (e.g., digests) in the file or data stream that were previously removed during TRE. Following 2580, the process 2500 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 27:
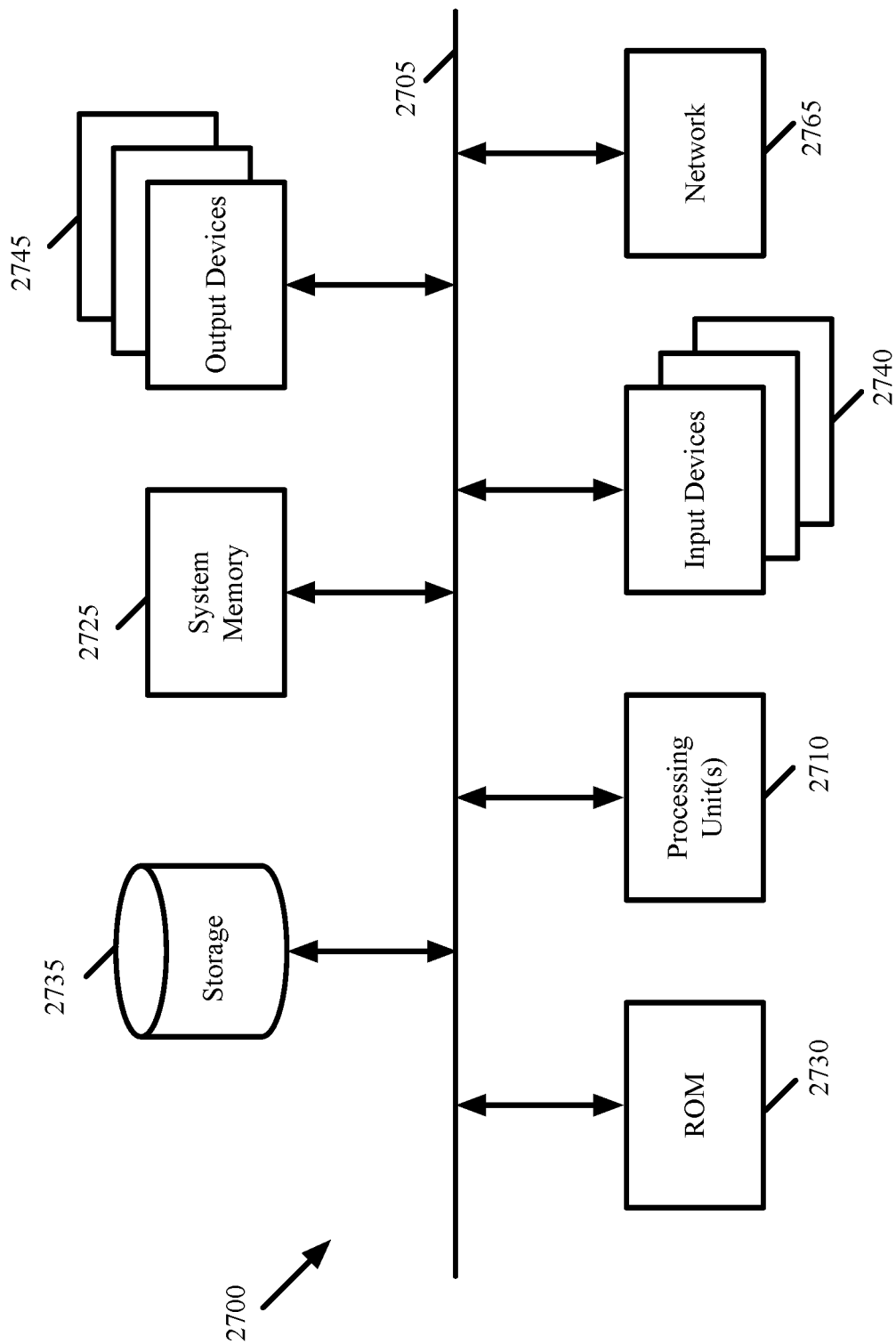
FIG. 27 conceptually illustrates a computer system with which some embodiments of the invention are implemented.

FIG. 27 conceptually illustrates a computer system 2700 with which some embodiments of the invention are implemented. The computer system 2700 can be used to implement any of the above-described hosts, controllers, gateway, and edge forwarding elements. As such, it can be used to execute any of the above described processes. This computer system 2700 includes various types of non-transitory machine-readable media and interfaces for various other types of machine-readable media. Computer system 2700 includes a bus 2705, processing unit(s) 2710, a system memory 2725, a read-only memory 2730, a permanent storage device 2735, input devices 2740, and output devices 2745.

The bus 2705 collectively represents all system, peripheral, and chipset buses that communicatively connect the numerous internal devices of the computer system 2700. For instance, the bus 2705 communicatively connects the processing unit(s) 2710 with the read-only memory 2730, the system memory 2725, and the permanent storage device 2735.

From these various memory units, the processing unit(s) 2710 retrieve instructions to execute and data to process in order to execute the processes of the invention. The processing unit(s) 2710 may be a single processor or a multi-core processor in different embodiments. The read-only-memory (ROM) 2730 stores static data and instructions that are needed by the processing unit(s) 2710 and other modules of the computer system 2700. The permanent storage device 2735, on the other hand, is a read-and-write memory device. This device 2735 is a non-volatile memory unit that stores instructions and data even when the computer system 2700 is off. Some embodiments of the invention use a mass-storage device (such as a magnetic or optical disk and its corresponding disk drive) as the permanent storage device 2735.

Other embodiments use a removable storage device (such as a floppy disk, flash drive, etc.) as the permanent storage device. Like the permanent storage device 2735, the system memory 2725 is a read-and-write memory device. However, unlike storage device 2735, the system memory 2725 is a volatile read-and-write memory, such as random access memory. The system memory 2725 stores some of the instructions and data that the processor needs at runtime. In some embodiments, the invention's processes are stored in the system memory 2725, the permanent storage device 2735, and/or the read-only memory 2730. From these various memory units, the processing unit(s) 2710 retrieve instructions to execute and data to process in order to execute the processes of some embodiments.

The bus 2705 also connects to the input and output devices 2740 and 2745. The input devices 2740 enable the user to communicate information and select commands to the computer system 2700. The input devices 2740 include alphanumeric keyboards and pointing devices (also called "cursor control devices"). The output devices 2745 display images generated by the computer system 2700. The output devices 2745 include printers and display devices, such as cathode ray tubes (CRT) or liquid crystal displays (LCD). Some embodiments include devices such as touchscreens that function as both input and output devices 2740 and 2745.

Finally, as shown in FIG. 27, bus 2705 also couples computer system 2700 to a network 2765 through a network adapter (not shown). In this manner, the computer 2700 can be a part of a network of computers (such as a local area network ("LAN"), a wide area network ("WAN"), or an Intranet), or a network of networks (such as the Internet). Any or all components of computer system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For example, many of the instances above describe operations performed at a destination where a receiver of a data stream resides that can also happen at an intermediate site that decompresses data streams and passes the decompressed data streams to a receiver, e.g., through a high-speed interconnect that connects the two different sites. Additionally, although many embodiments were described for optimizing traffic flow through a WAN, one of ordinary skill in the art would realize that many embodiments are equally applicable to optimizing traffic flow through a LAN or MAN. Thus, one of ordinary skill in the art would understand that the invention is not to be limited by the foregoing illustrative details, but rather is to be defined by the appended claims.

The invention claimed is:

1. A method for WAN (wide area network) optimization for a WAN that connects a first site that sends a data stream to a second site, the method comprising:
at a gateway router deployed to a public cloud:
receiving, in the data stream, an optimized, encrypted file and a corresponding set of encrypted indices comprising unique identifiers that categorize the optimized, encrypted file;
using the set of encrypted indices and a particular encryption key to decompose the optimized, encrypted file and to identify (i) a set of full encrypted segments that comprise a first portion of the encrypted file and (ii) a set of encrypted values that comprise a second portion of the encrypted file, wherein each encrypted value in the set of encrypted values maps to a respective segment stored in a segment cache at the second site;
for each encrypted value in the set of encrypted values, retrieving the respective segment from the segment cache; and
using the identified set of full segments and set of retrieved segments to reconstruct the encrypted file;
wherein the gateway router comprises a first gateway router and the public cloud comprises a first public cloud, wherein receiving the optimized, encrypted file from the first site comprises receiving the optimized, encrypted file from a second gateway router that is deployed to a second gateway cloud to perform a set of WAN optimization operations on the data stream originating from a source device at the first site and to forward the optimized data stream to a destination device at the second site.

2. The method of claim 1 further comprising forwarding the reconstructed encrypted file to a destination device at the second site.

3. The method of claim 2, wherein the destination device at the second site uses a secret decryption key generated by the source device at the first site to decrypt the reconstructed encrypted file.

4. The method of claim 1, wherein the encrypted file comprises ciphertext content generated from plaintext content.

5. The method of claim 1, wherein identifying the set of full segments further comprises storing each identified full segment in the segment cache.

6. The method of claim 5, wherein before receiving the optimized, encrypted data stream, each segment in the identified set of full segments was not included in the segment cache.

7. The method of claim 1, wherein retrieving the respective segment from the segment cache for each encrypted value in the set of encrypted values further comprises updating a state for the respective segment in the segment cache.

8. The method of claim 7, wherein updating the state for the respective segment comprises updating a last-seen timestamp for the respective segment.

9. The method of claim 8 further comprising periodically deleting segments from the segment cache.

10. The method of claim 9, wherein:
an expiration period is defined for each segment stored in the segment cache based on the last-seen time stamp for the segment, and
periodically deleting segments from the segment cache comprises (i) determining that a last-seen timestamp for a particular segment has not been updated within the defined expiration period, and (ii) deleting the particular segment from the segment cache.

11. The method of claim 1, wherein the particular encryption key comprises a symmetric encryption key shared with a source of the data stream located at the first site.

12. The method of claim 1, wherein the set of encrypted indices comprises unique identifiers to categorize the encrypted file.

13. The method of claim 1, wherein each encrypted value is generated using a probabilistic encryption function.

14. A non-transitory machine-readable medium storing a program for execution by a set of processing units, the program for processing a WAN-(wide area network) optimized data stream at a gateway router deployed to a public cloud, the WAN-optimized data stream sent from a first site to a second site, the first and second sites connected by a WAN, the program comprising sets of instructions for:
receiving, in the data stream, an optimized, encrypted file and a corresponding set of encrypted indices comprising unique identifiers that categorize the optimized, encrypted file;
using the set of encrypted indices and a particular encryption key to decompose the optimized, encrypted file and to identify (i) a set of full encrypted segments that comprise a first portion of the encrypted file and (ii) a set of encrypted values that comprise a second portion of the encrypted file, wherein each encrypted value in the set of encrypted values maps to a respective segment stored in a segment cache at the second site;
for each encrypted value in the set of encrypted values, retrieving the respective segment from the segment cache; and
using the identified set of full segments and set of retrieved segments to reconstruct the encrypted file;
wherein the program further comprises a set of instructions for periodically deleting segments from the segment cache by (i) determining that a last-seen timestamp for a particular segment has not been updated within the defined expiration period, and (ii) deleting the particular segment from the segment cache; and
wherein an expiration period is defined for each segment stored in the segment cache based on the last-seen time stamp for the segment.

15. The non-transitory machine-readable medium of claim 14, wherein after using the identified set of full segments and set of retrieved segments to reconstruct the encrypted file, the program further comprises a set of instructions for forwarding the reconstructed encrypted file to a destination device at the second site, wherein the destination device at the second site uses a secret decryption key generated by a source device at the first site to decrypt the encrypted file.

16. The non-transitory machine-readable medium of claim 14, wherein the set of instructions for retrieving the respective segment from the segment cache for each encrypted value in the set of encrypted values further comprises a set of instructions for updating a state for the respective segment in the segment cache by updating a last-seen timestamp for the respective segment.

17. The non-transitory machine-readable medium of claim 14, wherein the particular encryption key comprises a symmetric encryption key shared with a source device of the data stream located at the first site.

18. The non-transitory machine-readable medium of claim 14, wherein each encrypted value is generated using a probabilistic encryption function.

\* \* \* \* \*